US 6,692,017 B2

(12) United States Patent
Taoka et al.

(10) Patent No.: US 6,692,017 B2
(45) Date of Patent: Feb. 17, 2004

(54) AIRBAG APPARATUS FOR AUTOMOBILE

(75) Inventors: Yoshifumi Taoka, Ikeda (JP); Akihito Hayashi, Ikeda (JP); Mitsuo Yasuda, Fukumitsu-machi (JP)

(73) Assignees: Daihatsu Motor Co., Ltd., Osaka-Fu (JP); Sanko Gosei K.K., Toyama-Ken (JP)

(*) Notice: Subject to any disclaimer, the term of this patent is extended or adjusted under 35 U.S.C. 154(b) by 0 days.

(21) Appl. No.: 10/008,862

(22) Filed: Nov. 7, 2001

(65) Prior Publication Data

US 2002/0079675 A1 Jun. 27, 2002

(30) Foreign Application Priority Data

Dec. 25, 2000 (JP) .......................... 2000-392741
May 28, 2001 (JP) .......................... 2001-159280

(51) Int. Cl.⁷ .............................................. B60R 21/20
(52) U.S. Cl. .............................. 280/728.2; 280/728.3; 280/732
(58) Field of Search ...................... 280/728.3, 732, 280/728.2, 730.1

(56) References Cited

U.S. PATENT DOCUMENTS

| 4,148,503 | A | | 4/1979 | Shiratori et al. ............. 280/731 |
| 5,183,288 | A | | 2/1993 | Inada et al. ................. 280/732 |
| 5,322,324 | A | | 6/1994 | Hansen et al. ............... 280/732 |
| 5,411,288 | A | | 5/1995 | Steffens, Jr. ................ 280/728.3 |
| 5,549,324 | A | | 8/1996 | Labrie et al. ................ 280/728.3 |
| 5,569,959 | A | | 10/1996 | Cooper et al. ............... 280/728.3 |
| 5,685,560 | A | | 11/1997 | Sugiyama et al. ............ 280/731 |
| 5,738,367 | A | * | 4/1998 | Zichichi et al. ............. 280/728.3 |
| 5,769,451 | A | | 6/1998 | Inada et al. ................. 280/732 |
| 5,779,262 | A | | 7/1998 | Totani et al. ................ 280/728.3 |
| 5,806,879 | A | | 9/1998 | Hamada et al. .............. 280/728.2 |
| 5,816,609 | A | | 10/1998 | Gray et al. .................. 280/728.3 |
| 5,839,752 | A | | 11/1998 | Yamasaki et al. ............ 280/728.3 |
| 5,863,064 | A | | 1/1999 | Rheinlander et al. ........ 280/732 |
| 5,865,461 | A | | 2/1999 | Totani et al. ............... 280/728.3 |
| 5,868,419 | A | | 2/1999 | Taguchi et al. ............. 280/728.3 |
| 5,961,142 | A | | 10/1999 | Shiraki et al. ............. 280/728.3 |
| 6,012,735 | A | | 1/2000 | Gray et al. ................ 280/728.2 |
| 6,070,901 | A | | 6/2000 | Hazell et al. .............. 280/728.3 |
| 6,076,851 | A | * | 6/2000 | Davis et al. ............... 280/732 |
| 6,079,734 | A | | 6/2000 | Porter ..................... 280/728.3 |
| 6,089,642 | A | | 7/2000 | Davis, Jr. et al. ......... 296/70 |
| 6,109,645 | A | * | 8/2000 | Totani et al. ............. 280/728.3 |
| 6,161,865 | A | | 12/2000 | Rose et al. ............... 280/728.3 |
| 6,203,056 | B1 | | 3/2001 | Labrie et al. ............. 280/728.3 |
| 6,250,669 | B1 | | 6/2001 | Ohmiya .................... 280/732 |
| 6,299,198 | B1 | | 10/2001 | Nakashima et al. ......... 280/728.3 |
| 6,340,170 | B1 | | 1/2002 | Davis et al. .............. 280/730.1 |
| 6,394,485 | B1 | | 5/2002 | Amamori ................... 280/728.2 |
| 6,406,056 | B2 | | 6/2002 | Yokota ..................... 280/728.2 |
| 6,435,542 | B2 | | 8/2002 | Nakashima et al. ......... 280/728.3 |
| 6,494,481 | B2 | | 12/2002 | Yasuda .................... 280/732 |
| 2002/0005630 | A1 | * | 1/2002 | Suzuki et al. ............ 280/728.3 |

FOREIGN PATENT DOCUMENTS

| JP | 06-144142 | | 5/1994 | |
| JP | 07-172256 | | 7/1995 | |
| JP | 07291078 | A * | 11/1995 | ........... B60R/21/20 |
| JP | 10044910 | A * | 2/1998 | ........... B60R/21/20 |
| JP | 11-198752 | | 7/1999 | |
| JP | P2001-206180 | A | 7/2001 | |

* cited by examiner

*Primary Examiner*—Peter C. English
(74) *Attorney, Agent, or Firm*—Ladas & Parry

(57) ABSTRACT

An airbag apparatus for an automobile includes a fracture-opening section of an instrument panel cover; a frame member having edge portions in contact with a peripheral region around the fracture-opening section to thereby reinforce the instrument panel cover from inside; reinforcement plate members connected to the edge portions of the frame member by means of hinge portions and adapted to reinforce the fracture-opening section; and an airbag case which is located opposite to the instrument panel cover with respect to the frame member while being removably connected to the frame member.

12 Claims, 11 Drawing Sheets

AIRBAG APPARATUS FOR AUTOMOBILE

BACKGROUND OF THE INVENTION

1. Field of the Invention

The present invention relates to an airbag apparatus for an automobile for protecting a person in a vehicle such as a car; for example, a driver or a passenger sitting in the front passenger seat, from impact upon head-on or side collision of the vehicle to thereby ensure safety of the person. More particularly, the invention relates to an improvement in the structure of reinforcement for a surface panel, such as an instrument panel cover to be fractured upon inflation of an airbag.

2. Description of the Related Art

An airbag apparatus for a front passenger seat or a driver seat of a vehicle, such as a car, or that to be mounted on a side pillar of the vehicle basically includes an airbag, an airbag case for accommodating the folded airbag, and an inflater for inflating the airbag. The airbag apparatus is disposed inside an instrument panel cover of the vehicle.

Generally, an instrument panel cover of a car is made of a synthetic resin, such as polypropylene, and covers the surface of an instrument panel core formed integrally from a synthetic resin, such as polypropylene.

A conventional airbag apparatus for a front passenger seat will be described with reference to FIGS. 1 and 2. FIG. 1 is a perspective view showing a conventional instrument panel cover having a fracture-opening section for allowing an inflating airbag to project outward therethrough. FIG. 2 is a schematic sectional view taken along line II—II of FIG. 1.

Referring to FIGS. 1 and 2, an airbag apparatus for a front passenger seat 1 includes an airbag case 5 adapted to accommodate a folded airbag 4, which is inflated by means of gas from an inflater. The airbag case 5 is disposed behind a substantially horizontal surface 3a of an instrument panel cover 3 in the vicinity of a windshield 1a of a car.

The airbag case 5 has an opening portion 5a formed in opposition to the inside surface of the instrument panel cover 3. A flexible fracture-opening lid 6 formed of a synthetic resin is disposed at an opening portion 3b formed on the instrument panel cover 3 in opposition to the opening portion 5a of the airbag case 5, so as to cover the opening portion 3b. Upon inflation of the airbag 4, the fracture-opening lid 6 is split open in a casement condition through fracture along a center groove 6a and peripheral grooves 6b, which are formed on the inside surface of the fracture-opening lid 6 in opposition to the opening portion 5a of the airbag case 5. The inflating airbag 4 projects outward through the thus-formed opening.

A mounting leg portion 7 and a plurality of engagement pieces 8 are formed on the inside surface of the fracture-opening lid 6. The mounting leg portion 7 assumes the form of a rectangular frame slightly greater in size than the opening portion 5a of the airbag case 5. The engagement pieces 8 are elastically engaged with the edge of the opening portion 3b of the instrument panel cover 3. A plurality of rectangular through-holes 7c are formed in a front wall 7a of and in a rear wall 7b of the mounting leg portion 7. The rectangular through-holes 7c are engaged with corresponding hooks 9 provided on a front wall 5b and a rear wall 5b of the opening portion 5a of the airbag case 5, thereby attaching the fracture-opening lid 6 to the opening portion 3b of the instrument panel cover 3.

When, upon inflation of the airbag 4, the fracture-opening lid 6 is split open in a casement condition through fracture along the center groove 6a and the peripheral grooves 6b, the rectangular through-holes 7c formed in the front and rear walls 7a and 7b of the mounting leg portion 7 are engaged with the hooks 9 provided on the front and rear walls 5b of the opening portion 5a of the airbag case 5, thereby preventing scattering of the fracture pieces of the fracture opening lid 6.

According to the airbag apparatus for a front passenger seat shown in FIG. 1, the opening portion 3b is formed in the instrument panel cover 3 in such a manner as to face the opening portion 5a of the airbag case 5. The fracture-opening lid 6 is a discrete element different from the instrument panel cover 3 and made of a flexible resin material and is fitted to the opening portion 3b. Thus, the manufacture and the assembly work of the instrument panel cover 3 and the fracture-opening lid 6 are rather complicated. Also, the fracture-opening lid 6 easily deforms when an external force is applied thereto, and encounters difficulty in matching color with the instrument panel cover 3 because it is made of material different from that of the instrument panel cover 3, thereby damaging the appearance or design of the instrument panel cover 3.

In order to solve the above-mentioned problems, there has been proposed a seamless-type airbag apparatus for a front passenger seat. The airbag apparatus does not employ a discrete fracture-opening lid, and therefore a fracture line of an opening portion of an instrument panel cover is invisible.

The proposed airbag apparatus is shown in FIGS. 3 and 4. FIG. 3 is a schematic perspective view showing a single-plate-type instrument panel cover 3 having a fracture-opening section 30 for allowing an inflating airbag to project outward therethrough. FIG. 4 is a schematic sectional view taken along line IV—IV of FIG. 3.

As shown in FIGS. 3 and 4, hinge grooves 30a and fracture grooves 30b and 30c are formed on the inside surface of the instrument panel cover 3 by use of a laser. Specifically, a pulsating laser beam is perpendicularly applied to the inside surface of the instrument panel cover 3 while being moved along peripheral portions of reinforcement plate members 10 fixed to the inside surface, thereby forming the grooves 30a, 30b, and 30c; i.e., forming the fracture-opening section 30 having a size corresponding to that of the opening portion 5a of the airbag case 5 and adapted to allow an inflating airbag to project outward therethrough.

The longitudinally formed fracture groove 30b and the fracture grooves 30c formed perpendicularly to the fracture groove 30b divide the fracture-opening section 30 into a front fracture-opening subsection 31 and a rear fracture-opening subsection 32. Upon inflation of an airbag, the fracture-opening subsections 31 and 32 are split apart from each other in a casement condition (in opposite directions) while hinging on the hinge grooves 30a.

When, upon inflation of an airbag, the fracture-opening section 30 of the instrument panel cover 3 is split open by pressure of the inflating airbag 4, the hinge groove 30a may be broken with a resultant separation of the fracture-opening subsections 31 and 32 from the instrument panel cover 3. In order to avoid this problem, the paired reinforcement plate members 10 are provided on the inside surface of the fracture-opening section 30 of the instrument panel cover 3. Specifically, horizontal first end portions of the reinforcement plate members 10 are fixedly attached to the inside surface of the fracture-opening section 30 through thermal joining or like processing. Second end portions 10a of the reinforcement plate members 10 are bent at their hinge portions 11 and extend downward along the inner surfaces of front and rear walls of a frame-shaped reinforcement rib 12 projecting integrally from the inside surface of the instrument panel cover 3. The front and rear walls of the reinforcement rib 12 and corresponding second end portions 10a of the reinforcement plate members 10 are engaged with corresponding hooks 36 attached to front and rear walls 5b of the airbag case 5. The inside distance between the second end portions 10a is slightly greater than a corresponding outer size of the opening portion 5a of the airbag case 5. The reinforcement plates 10 prevent scattering of the fracture-opening subsections 31 and 32 of the fracture-opening section 30 of the instrument panel cover 3 upon inflation of an airbag, thereby solving a problem involved in the conventional airbag apparatus having the discrete fracture-opening lid 6.

In order to allow the fracture-opening subsections 31 and 32 to be split open smoothly, hook engagement holes 10b formed in the corresponding second end portions 10a of the paired reinforcement plate members 10 assume a sufficiently large size so as to allow upward movement of the second end portions 10a when the fracture-opening subsections 31 and 32 are split open. Reference numeral 13 denotes a thin-walled portion of the reinforcement rib 12 at which the reinforcement rib 12 and the instrument panel cover 3 are integrated together. The thin-walled portion 13 is adapted to prevent formation of a sink mark on the front surface of the instrument panel cover 3 when the instrument panel cover 3 is molded.

The thus-configured airbag apparatus for a front passenger seat functions in the following manner. Upon collision of the vehicle, an impact force caused by the collision is detected by a sensor. A control unit including a CPU judges whether or not the detected impact force is equal to or higher than a predetermined value. When the control unit judges that the impact force is not lower than the predetermined value, the control unit issues a signal for causing the inflater to generate a predetermined gas. The gas is fed to the airbag so as to promptly inflate the airbag.

The inflating airbag presses, from inside, the fracture-opening section 30 of the instrument panel cover 3. The fracture-opening section 30 is fractured along the fracture grooves 30b and 30c in a casement condition.

The thus-fractured front and rear fracture-opening subsections 31 and 32 are opened outward while being turned inside out about the hinge portions 11 of the reinforcement plate members 10. Simultaneously, the inflating airbag 4 projects outward from the instrument panel cover 3 through the thus-formed opening in the instrument panel cover 3. Serving as a cushion, the inflated airbag 4 supports a front seat passenger at his/her chest and head, thereby protecting the passenger from the impact force of collision.

In the above-described airbag apparatus, the reinforcement plate members 10 and the reinforcement rib 12 are provided on the inside surface of the instrument panel cover 3 in a peripheral region around the fracture-opening section 30. However, in order to facilitate the installation work of the airbag case 5 and fracture-opening of the fracture-opening subsections 31 and 32, vertical play is provided at engagements of the reinforcement plate members 10 and the reinforcement rib 12 with the hooks 36. That is, the reinforcement plate members 10 and the reinforcement rib 12 are not configured to support a pressing force imposed from above; i.e., a pressing force imposed on the instrument panel cover 3. If a load is mistakenly imposed on the instrument panel cover 3, the hinge grooves 30a and/or the fracture grooves 30b and 30c may be fractured. As a result, the fracture-opening section 30 is dented or the peripheral edge of the fracture-opening section 30 is deformed, thereby damaging the appearance of the instrument panel cover 3.

In the fracture-opening section 30 of the improved instrument panel cover 3, the fracture grooves 30b and 30c are formed on the inside surface of the instrument panel cover 3; the reinforcement plate members 10 are fixedly attached to the inside surface of the fracture-opening section 30 through thermal joining while being located on opposite sides of the fracture groove 30b with respect to the front-rear direction of the fracture-opening section 30; and each of the fracture grooves 30c is located between the reinforcement plate members 10 and the reinforcement rib 12. Thus, upon inflation of an airbag, the fracture-opening section 30 is split open smoothly along the fracture grooves 30b and 30c. Therefore, formation of a sharp edge or a like problem is not involved. However, in the case where the instrument panel cover 3 has a certain shape, molding of the instrument panel cover 3 must employ a slide mold for formation of the reinforcement rib 12. Also, since the height of the reinforcement rib 12 projecting perpendicularly from the instrument panel cover 3 is large as compared with the wall thickness of the instrument panel cover 3, when the reinforcement rib 12 shrinks in the course of cooling after withdrawal of a mold, a sink mark tends to arise on the front surface of the instrument panel cover 3 at a position corresponding to the reinforcement rib 12. Therefore, various measures must be taken against occurrence of a sink mark.

As shown in FIG. 5, the reinforcement plate members 10 for the fracture-opening section 30 in the conventional airbag apparatus are each formed from a single metal plate. Protrusions 31A arranged uniformly on the entire inside surface of the fracture-opening section 30 are fitted into elongated holes 10d that are formed in the reinforcement plate members 10 and arranged in the same pattern as that of the protrusions 31A. The protrusions 31A projecting from the corresponding elongated holes 10d are melted through application of heat to thereby be engaged with the reinforcement plate members 10. Thus, the reinforcement plate members 10 are unitarily fixed to the fracture-opening section 30 made of a synthetic resin. However, this structure involves the following problem: when temperature variations cause a large expansion/shrinkage difference between the reinforcement plate members 10 and the fracture-opening section 30, the difference cannot be absorbed. As a result, the surface of the instrument panel cover 3 including the fracture-opening section 30 is undulated, thereby damaging the appearance of the instrument panel cover 3.

Also, when a tensile stress induced by the above-mentioned expansion/shrinkage difference is imposed on thermally joined portions between the reinforcement plate members 10 and the fracture-opening section 30, the thermally joined portions may be partially fractured, with a resultant partial separation of the reinforcement plate member 10 from the fracture-opening section 30. As a result, upon inflation of an airbag, the following problems may arise: the fracture-opening section 30 fails to be properly fractured along the fracture grooves 30b and 30c; the reinforcement plate members 10 fail to be smoothly opened apart from each other about their hinge portions 11; edge portions of an opening formed after fracture of the fracture-opening section 30 are burred or cracked; and in the worst case, the fracture-opening section 30 is scattered in pieces.

When an external impact force is locally applied to the fracture-opening section 30, the impact force is imposed on thermally joined portions between the reinforcement plate members 10 and the fracture-opening section 30. As a result, the thermally joined portions may be partially fractured.

SUMMARY OF THE INVENTION

An object of the present invention is to solve the above-mentioned problems in the conventional airbag apparatus for an automobile and to provide an airbag apparatus for an automobile exhibiting improved resistance to a pressing load imposed externally on a fracture-opening section and its peripheral region of a surface panel covering an instrument panel region, a side pillar region, or a central portion of a steering wheel of a vehicle; facilitating attachment of an airbag case and relevant components to the inside surface of the surface panel; not requiring formation of a reinforcement rib around the fracture-opening section; being unlikely to form a sharp edge at a fracture surface of the fracture-opening section; and facilitating, during scrapping a car, removal of airbag components, particularly an inflater, which is categorized as industrial waste.

Another object of the present invention is to provide an airbag apparatus for an automobile exhibiting improved resistance to a pressing load imposed externally on a fracture-opening section and its peripheral region of a surface panel covering an instrument panel region, a side pillar region, or a central portion of a steering wheel of a vehicle, and capable of absorbing an external force imposed on the fracture-opening section and a thermal expansion/shrinkage difference between the fracture-opening section and a reinforcement plate member for the fracture-opening section.

To achieve the above objects, an airbag apparatus for an automobile of the present invention comprises a frame member having an edge portion for reinforcing the surface panel from inside, the edge portion being in close contact with or in the vicinity of a peripheral region around the fracture-opening section of the surface panel. Thus, even when a pressing force is imposed on the upper surface of the surface panel, the edge portion of the frame member supports from underneath a region of the fracture-opening section including fracture grooves and hinge grooves, thereby preventing occurrence of a dent in the fracture-opening section and deformation of the peripheral edge of a potential opening of the fracture-opening section. Also, since the frame member and the reinforcement plate member are configured as a single unit, attachment to the inside surface of the surface panel is facilitated.

According to the present invention, rest segments formed at the edge portion of the frame member support from underneath the fracture-opening section and a peripheral region around a potential opening of the fracture-opening section, thereby more reliably preventing occurrence of a dent in the fracture-opening section and deformation of the peripheral edge of the potential opening of the fracture-opening section.

According to the present invention, joint segments are fixedly attached to a peripheral region around a potential opening of the fracture-opening section. Thus, in cooperation with the rest segments, the joint segments reinforce the peripheral edge of the potential opening of the fracture-opening section without employment of a reinforcement rib, thereby preventing formation of a sharp edge at, or a partly detached piece from, a fracture portion of the fractured fracture-opening section upon inflation of an airbag and thus providing a neat fracture surface.

According to the present invention, an airbag support member is separably connected to the frame member. Thus, when a car is to be scrapped, the airbag support member can be easily detached from the frame member, so that an inflater and other relevant components can be easily removed for proper disposal to thereby prevent potential environmental contamination.

According to the present invention, thermal joint protrusions are integrally formed on the inside surface of the fracture-opening section and inserted through through-holes formed in the reinforcement plates. The inserted thermal joint protrusions are melted and crushed to thereby firmly join the reinforcement plates and the fracture-opening section.

According to the present invention, a tentative fixing member is provided for tentatively fixing the reinforcement plates in place when the reinforcement plates and the fracture-opening section are to be joined through melting of the thermal joint protrusions.

According to the present invention, a plurality of slits are formed in the reinforcement plate member. The slits function to absorb a thermal expansion difference between the reinforcement plate member and the fracture-opening section. Thus, even when the reinforcement plate member and the fracture-opening section are exposed to a high-temperature atmosphere, fracture of thermal joint protrusions of resin joining them can be prevented.

According to the present invention, the reinforcement plate member is divided into a plurality of reinforcement segments arranged along the longitudinal direction of the fracture-opening section; the reinforcement segments are connected to the edge portion of the frame member by means of corresponding arcuate hinge portions; the reinforcement segments are fixedly attached to the fracture-opening section; and the adjacent reinforcement segments are connected by means of an elastic segment. The configuration functions to absorb a thermal expansion difference between the reinforcement segments and the fracture-opening section, as well as a difference in expansion/shrinkage therebetween caused by application of an external force, thereby preventing fracture of thermal joint protrusions of resin joining the reinforcement segments and the fracture-opening section, which would otherwise result from the thermal expansion difference or the difference in expansion/shrinkage. Also, the configuration allows the reinforcement segments to easily follow the deformation of the fracture-opening section upon inflation of an airbag, thereby preventing fracture of the thermal joint protrusions of resin and enabling the fracture-opening section to be smoothly split open.

According to the present invention, the frame member comprises joint portions extending outward, along the inside surface of the surface panel, from opposite sides of the edge portion of the frame member with respect to the longitudinal direction of the fracture-opening section; and the opposite joint portions are fixedly attached to the inside surface of the surface panel, thereby more reliably preventing occurrence of a dent in the fracture-opening section and deformation of the peripheral edge of the potential opening of the fracture-opening section.

According to the present invention, each of the joint portions is divided into a plurality of joint segments arranged along the lateral direction of the fracture-opening section; the joint segments are fixedly attached to the surface panel; and adjacent joint segments are connected by means of an elastic segment. Thus, even when an expansion/shrinkage difference between the surface panel and the joint portions of the frame member arises from an external cause, such as temperature variations, the joint portions can absorb such a difference, thereby preventing occurrence of undulation of the surface panel and thus maintaining the appearance of the surface panel intact.

DESCRIPTION OF THE PREFERRED EMBODIMENTS

Embodiments of the present invention will next be described in detail with reference to the drawings.

FIGS. 6–10 show an airbag apparatus for an automobile according to a first embodiment of the present invention and applied to use with a front passenger seat.

Figure 1:
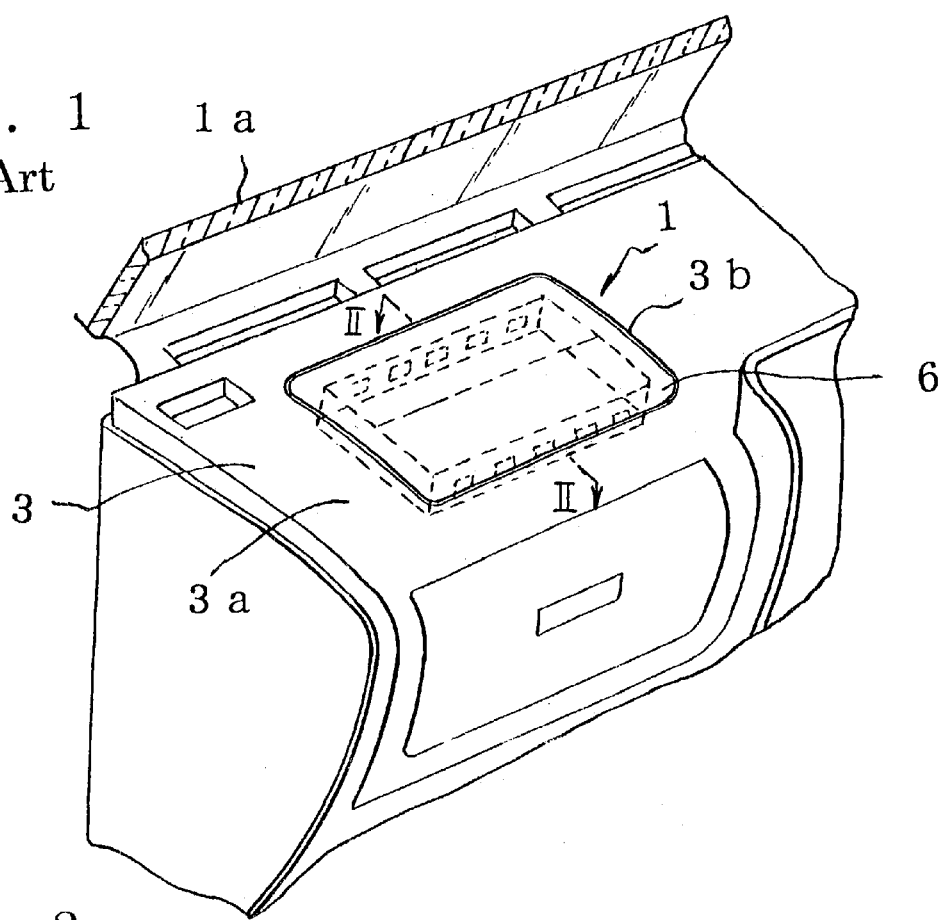
FIG. 1 is a schematic perspective view for illustrating a conventional airbag apparatus for a front passenger seat, showing an instrument panel cover having a fracture-opening section for allowing an inflating airbag to project outward therethrough.
Figure 2:
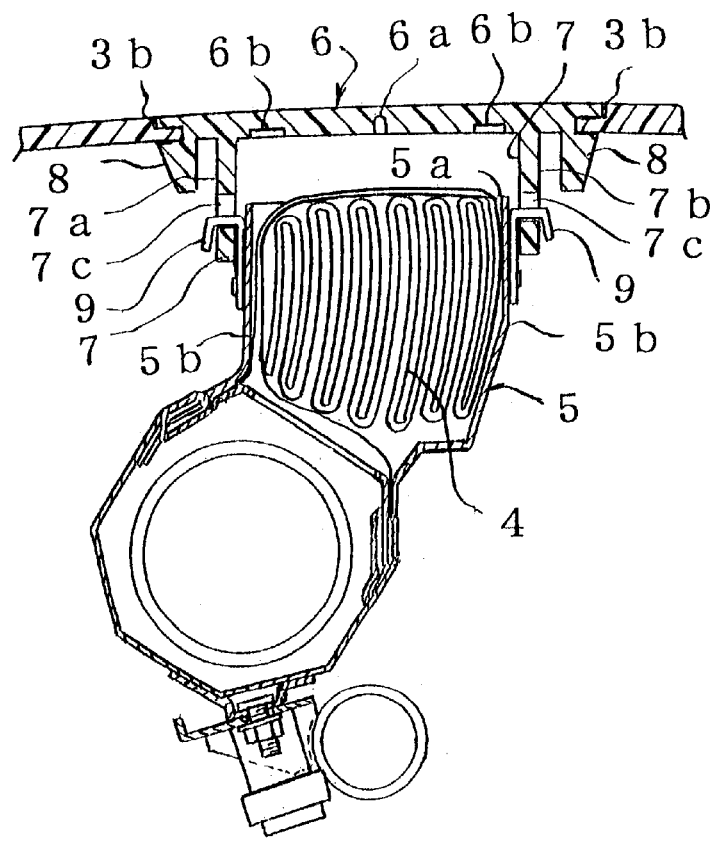
FIG. 2 is a schematic sectional view taken along line II—II of FIG. 1.
Figure 3:
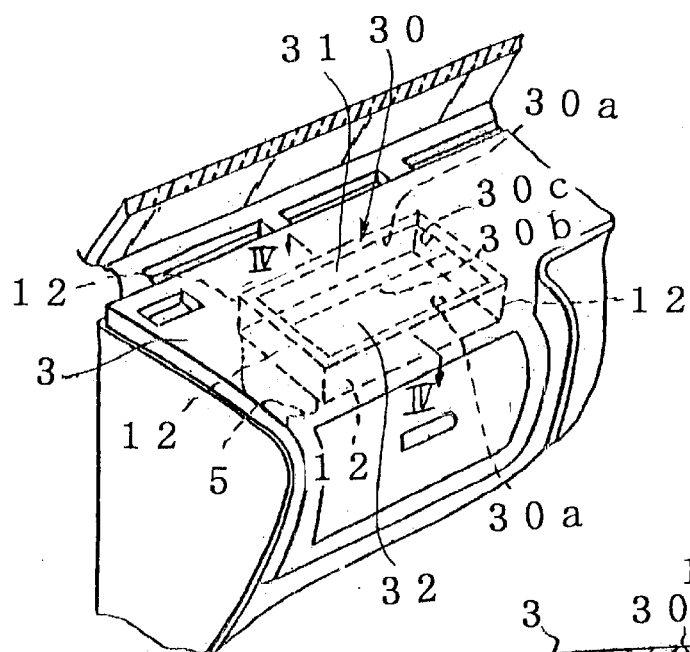
FIG. 3 is a schematic perspective view for illustrating a conventional airbag apparatus for a front passenger seat, showing a single-plate-type instrument panel cover having a fracture-opening section for allowing an inflating airbag to project outward therethrough.
Figure 4:
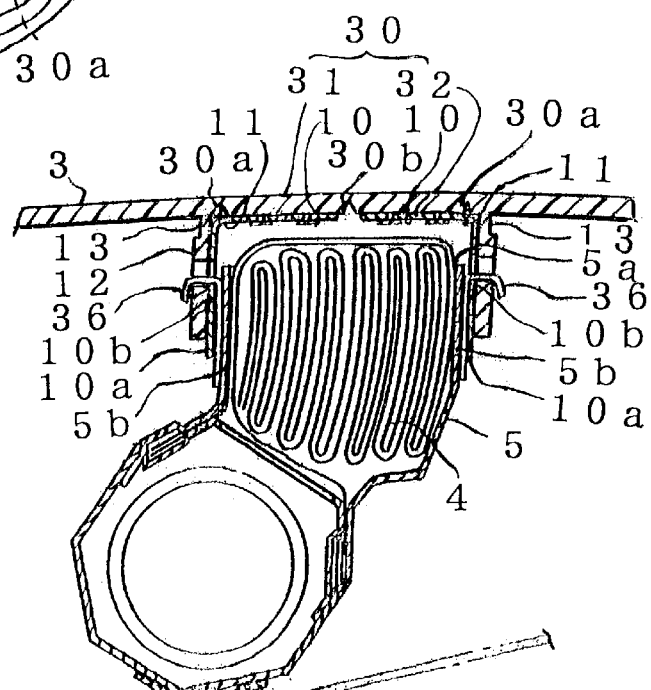
FIG. 4 is a schematic sectional view taken along line IV—IV of FIG. 3.
Figure 5:
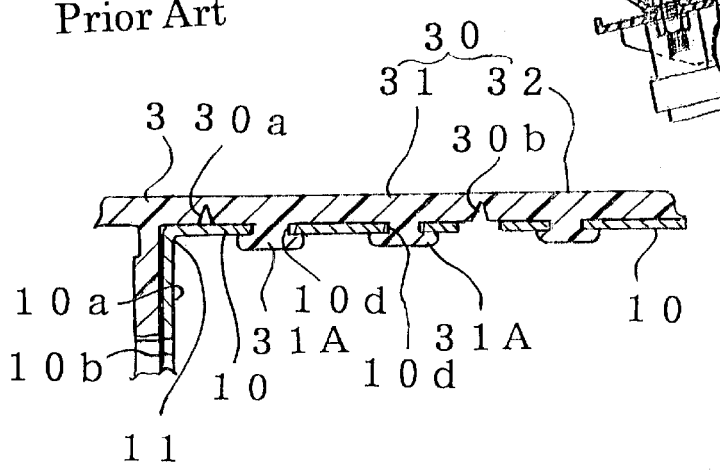
FIG. 5 is an enlarged view showing a thermally joined state of a fracture-opening section and a reinforcement plate member in a conventional airbag apparatus for a front passenger seat.
Figure 6:
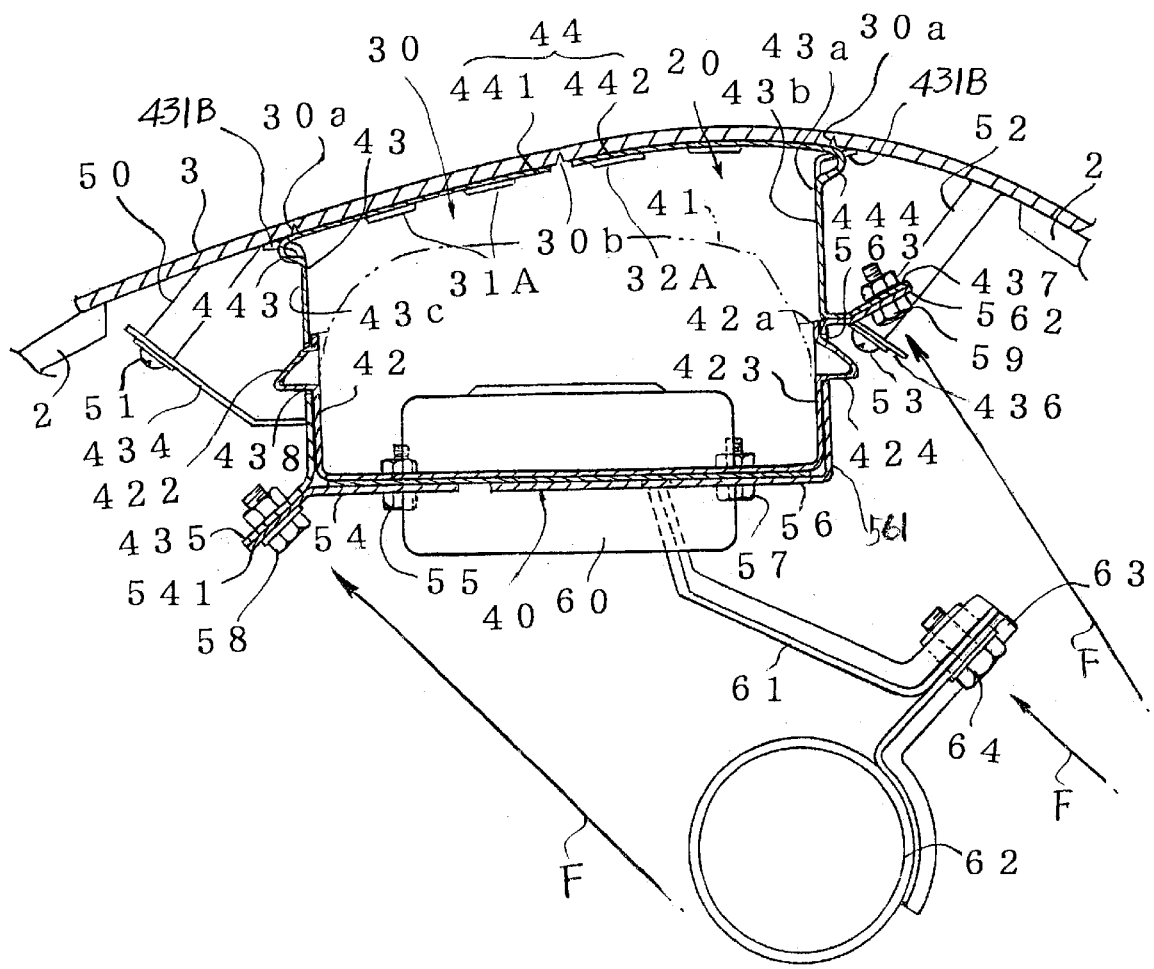
FIG. 6 is a sectional view of essential portions of an airbag apparatus for an automobile according to a first embodiment of the present invention and applied to use with a front passenger seat.

In FIG. 6, reference numeral 3 denotes an integrally molded instrument panel cover made of a synthetic resin, such as polypropylene. The instrument panel cover 3, which serves as the surface panel, covers an instrument panel core 2 fixed to an unillustrated car body and is fixedly attached to the instrument panel core 2 by use of appropriate means, such as tapping screws.

As shown in FIG. 6, an accommodation section 20 for accommodating an airbag apparatus for an automobile 40 is formed behind a left-hand portion (for right-hand drive) of the instrument panel cover 3 in opposition to a front passenger seat. A left-hand drive employs a mirror image of the configuration of the present embodiment; i.e., the accommodation section 20 is formed behind a right-hand portion of the instrument panel cover 3.

The airbag apparatus for an automobile 40 includes an airbag 41 to be inflated by means of gas from an inflater; an airbag case 42, which serves as the airbag support member, for accommodating the airbag 41 in a folded condition; a frame member 43 made of metal; and a reinforcement plate member 44 made of metal and adapted to reinforce a fracture-opening section 30.

The fracture-opening section 30 is formed on the instrument panel cover 3 in opposition to the accommodation section 20. The fracture-opening section 30 is split open upon inflation of the airbag 41.

Figure 8:
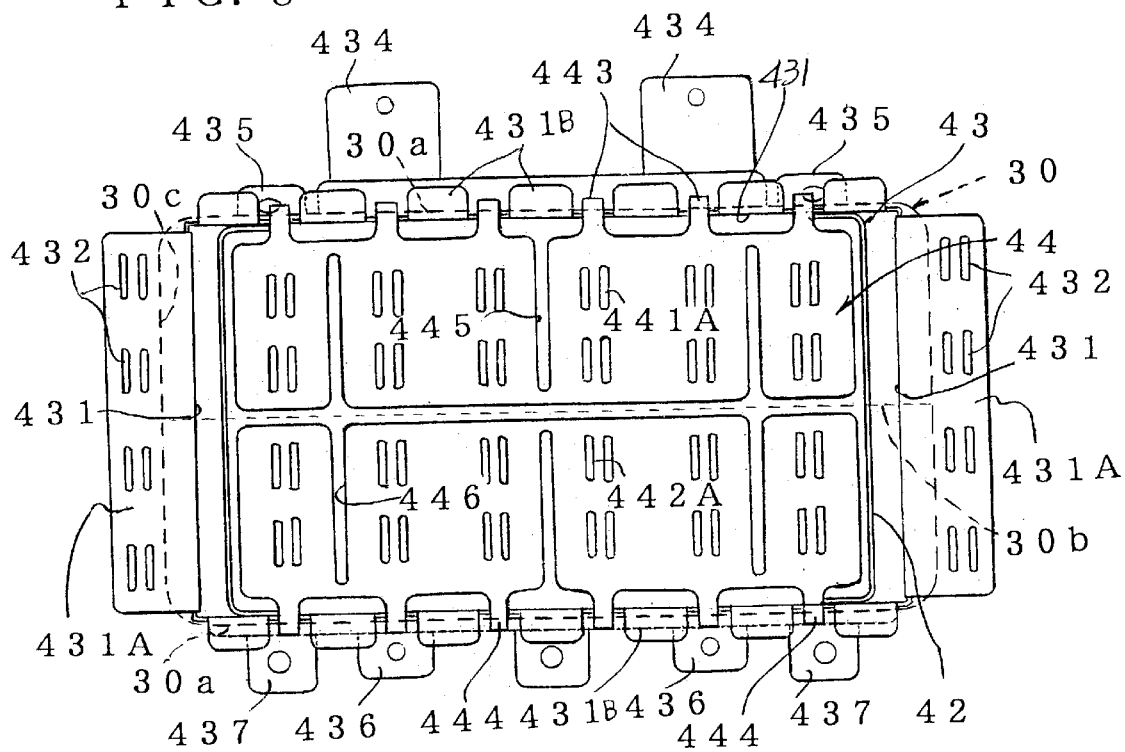
FIG. 8 is a plan view showing the frame member and the reinforcement plate member formed as a unit in the first embodiment.
Figure 9:
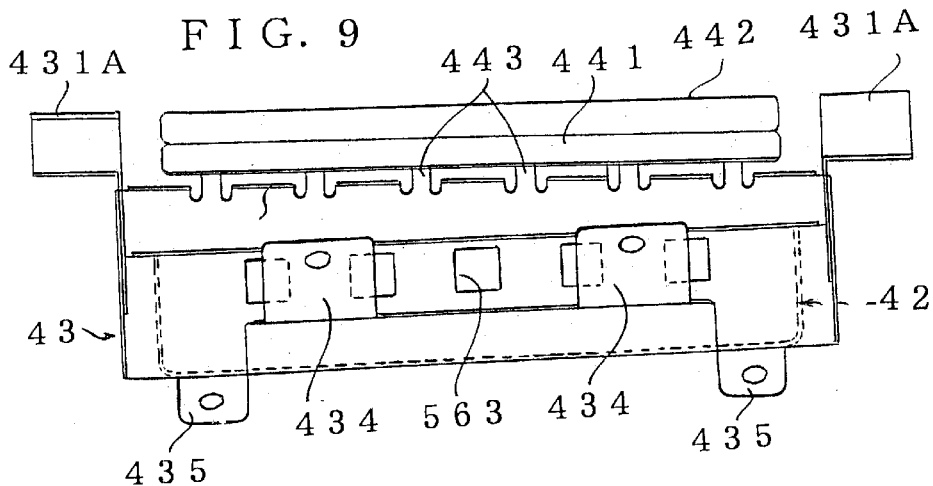
FIG. 9 is a side view showing the frame member and the reinforcement plate member of FIG. 8.
Figure 10:
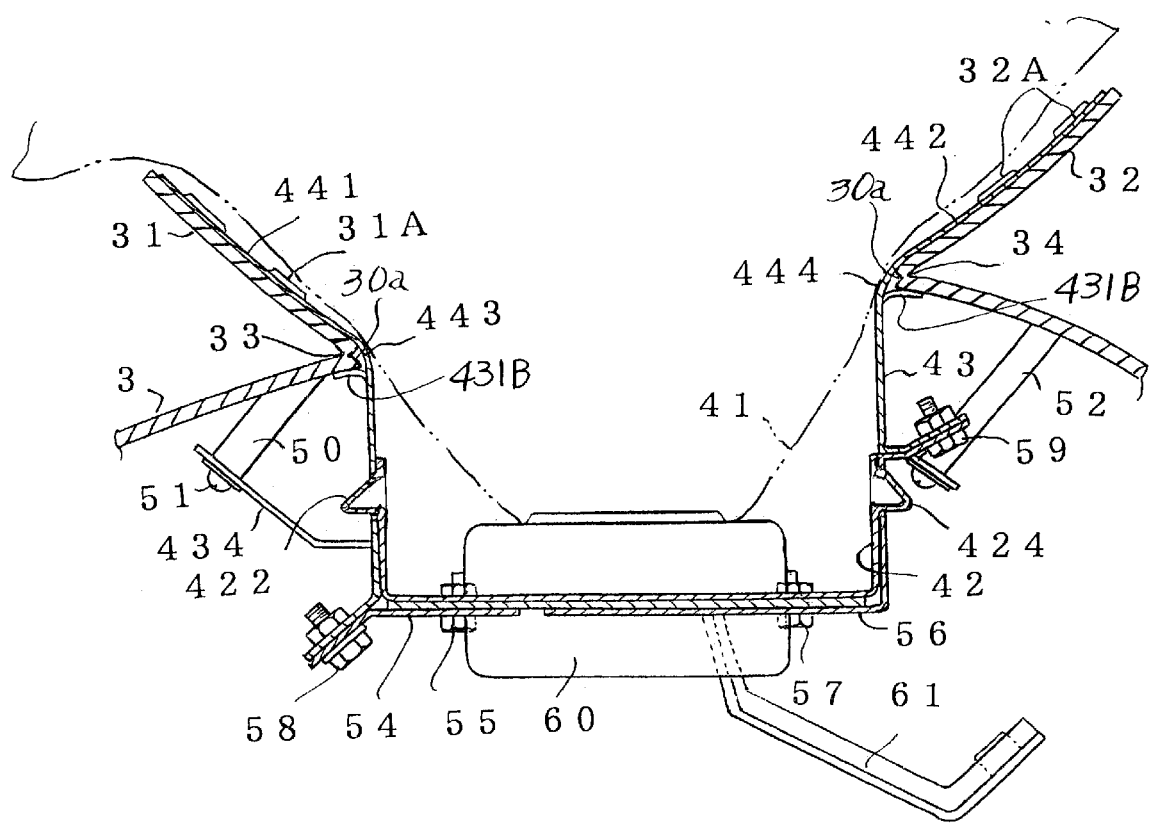
FIG. 10 is a sectional view showing the airbag apparatus for an automobile according to the first embodiment as observed upon inflation of an airbag.

As illustrated by the dashed line of FIG. 8, hinge grooves 30a and side fracture grooves 30c are formed on the inside surface of the instrument panel cover 3 through laser processing to thereby define the fracture-opening section 30 assuming a rectangular shape substantially identical to that of an opening portion 42a of the airbag case 42. A center fracture groove 30b is formed, through laser processing, on the fracture-opening section 30 along the longitudinal direction of the fracture-opening section 30 in such a manner as to extend between the centers of the side fracture grooves 30c. Upon inflation of the airbag 41, the fracture-opening section 30 is fractured at the side fracture grooves 30c and the center fracture groove 30b. As a result, as shown in FIG. 10, the fracture-opening section 30 is split into fracture-opening subsections 31 and 32 such that the fracture-opening subsections 31 and 32 are turned inside out about hinges 33 and 34, which are implemented by the corresponding hinge grooves 30a, in opposite directions.

The frame member 43 is attached to the inside surface of the instrument panel cover 3 at a peripheral region around the fracture-opening section 30. The frame member 43 holds the airbag case 42 such that the opening portion 42a of the airbag case 42 faces the fracture-opening section 30 and is located between the inside surface of the instrument panel cover 3 and the airbag case 42. As shown in FIGS. 6 to 9, the frame member 43 assumes the form of a quadrangular prism which has four side walls corresponding to the hinge grooves 30a and the fracture grooves 30c, which define the rectangular fracture-opening section 30.

Longitudinal edge portions 431 of one end of the frame member 43 which face the inside surface of the instrument panel cover 3 are partially bent outward substantially at right angles to thereby form rest segments 431B. The rest segments 431B are in close contact with a peripheral region along the hinge grooves 30a of the fracture-opening section 30 from inside the instrument panel cover 3 to thereby support the peripheral region. Joint segments 431A are formed at right- and left-hand lateral edge portions 431 of the frame member 43 in such a manner as to extend outward from the edge portions 431 along the inside surface of the instrument panel cover 3. A plurality of through-holes 432 are formed in the joint segments 431A and used to thermally join the joint segments 431A to the inside surface of the instrument panel cover 3.

The rest segments 431B are disposed across the hinge grooves 30a; i.e., across the peripheral edge of a potential opening of the fracture-opening section 30, to thereby support the instrument panel cover 3 from underneath. The joint segments 431A are disposed across the fracture grooves 30c; i.e., across the peripheral edge of the potential opening of the fracture-opening section 30, to thereby support the instrument panel cover 3 from underneath.

The rest segments 431B and the joint segments 431A are not necessarily in close contact with the inside surface of the instrument panel cover 3 and may be disposed in the vicinity of the inside surface of the instrument panel cover 3 such that, when a force is applied to the instrument panel cover 3 from above and causes the instrument panel cover 3 to be deflected, the segments 431A and 431B support the instrument panel cover 3 from underneath against breakage of the instrument panel cover 3.

When the frame member 43 is to be fixedly attached to the inside surface of the instrument panel cover 3, thermal joint protrusions 31A and 32A (see FIG. 6) formed integrally on the inside surface of the instrument panel cover 3 are inserted through the corresponding through-holes 432 formed in the joint segments 431A, followed by melting and crushing.

One end of a reinforcement plate 441 (442) corresponding to the front (rear) fracture-opening subsection 31 (32) is connected to a front (rear) longitudinal edge portion of an opening 43a of the frame member 43 located in opposition to the inside surface of the instrument panel cover 3 by means of a plurality of hinge portions 443 (444) such that the reinforcement plates 441 and 442 can move from a state of closing the opening 43a of the frame member 43 as shown in FIG. 6 to a state of opening the opening 43a for allowing the inflating airbag 41 to project therethrough as shown in FIG. 10.

The reinforcement plates 441 and 442 constitute the reinforcement plate member 44 for reinforcing the fracture-opening section 30. A number of through-holes 441A (442A) are formed in the entire region of the reinforcement plate 441 (442) for use in thermally joining the reinforcement plate 441 (442) to the inside surface of the fracture-opening subsection 31 (32). When the reinforcement plate 441 (442) is to be fixedly attached to the inside surface of the fracture-opening subsection 31 (32), the thermal joint protrusions 31A (32A) formed integrally on the inside surface of the fracture-opening subsection 31 (32) are inserted through the corresponding through-holes 441A (442A) formed in the reinforcement plate 441 (442), followed by melting and crushing.

Prior to the thermal joining work, as shown in FIG. 6, support rods 50 and 52 provided on the inside surface of the instrument panel cover 3 and connection segments 434 and 436 provided on the side faces of the frame member 43 are connected by use of tapping screws 51 and 53 so as to tentatively fix the frame member 43 to the instrument panel cover 3, thereby positioning the frame member 43 with respect to the instrument panel cover 3 and thus improving installation workability of the frame member 43. This tentative fixation is also useful in thermally joining the joint segments 431A to the instrument panel cover 3. The support rods 50 and 52, the connection segments 434 and 436, and the tapping screws 51 and 53 constitute the tentative fixation member for tentatively fixing the instrument panel cover 3 and the frame member 43 together.

A plurality of slits 445 (446) are formed in the reinforcement plate 441 (442) in such a manner as to extend in the lateral direction of the reinforcement plate 441 (442) and to be arranged at predetermined intervals in the lateral and longitudinal directions of the reinforcement plate 441 (442). The slits 445 and 446 function to absorb a thermal expansion difference between the reinforcement plates 441 and 442 and the fracture-opening subsections 31 and 32, thereby preventing fracture of the thermal joint protrusions 31A and 32A of resin joining the reinforcement plates 441 and 442 and the fracture-opening subsections 31 and 32, which would otherwise result from the thermal expansion difference. Also, the configuration allows the reinforcement plates 441 and 442 to easily follow the deformation of the fracture-opening subsections 31 and 32 upon inflation of the airbag 41, thereby preventing fracture of the thermal joint protrusions 31A and 32A of resin and enabling the fracture-opening subsections 31 and 32 to be smoothly opened.

As shown in FIGS. 6 to 10, a plurality of connection segments 434 for fixing the frame member 43 to the instrument panel cover 3 and a plurality of connection segments 435 for connecting the airbag case 42 to the frame member 43 are provided at a lower end portion of a longitudinal front wall 43c of the frame member 43 in a frontward projecting condition. Also, a plurality of connection segments 436 for fixing the frame member 43 to the instrument panel cover 3 and a plurality of connection segments 437 for connecting the airbag case 42 to the frame member 43 are provided at a lower end portion of a longitudinal rear wall 43b of the frame member 43 in a rearward projecting condition.

Accordingly, as shown in FIG. 6, the connection segments 434 provided on the front wall surface of the frame member 43 are connected to the corresponding support rods 50 projectingly provided on the inside surface of the instrument panel cover 3 by use of the tapping screws 51, and the connection segments 436 provided on the rear wall surface of the frame member 43 are connected to the corresponding support rods 52 projectingly provided on the inside surface of the instrument panel cover 3 by use of the tapping screws 53, whereby the frame member 43 is fixed to the instrument panel cover 3.

Figure 7:
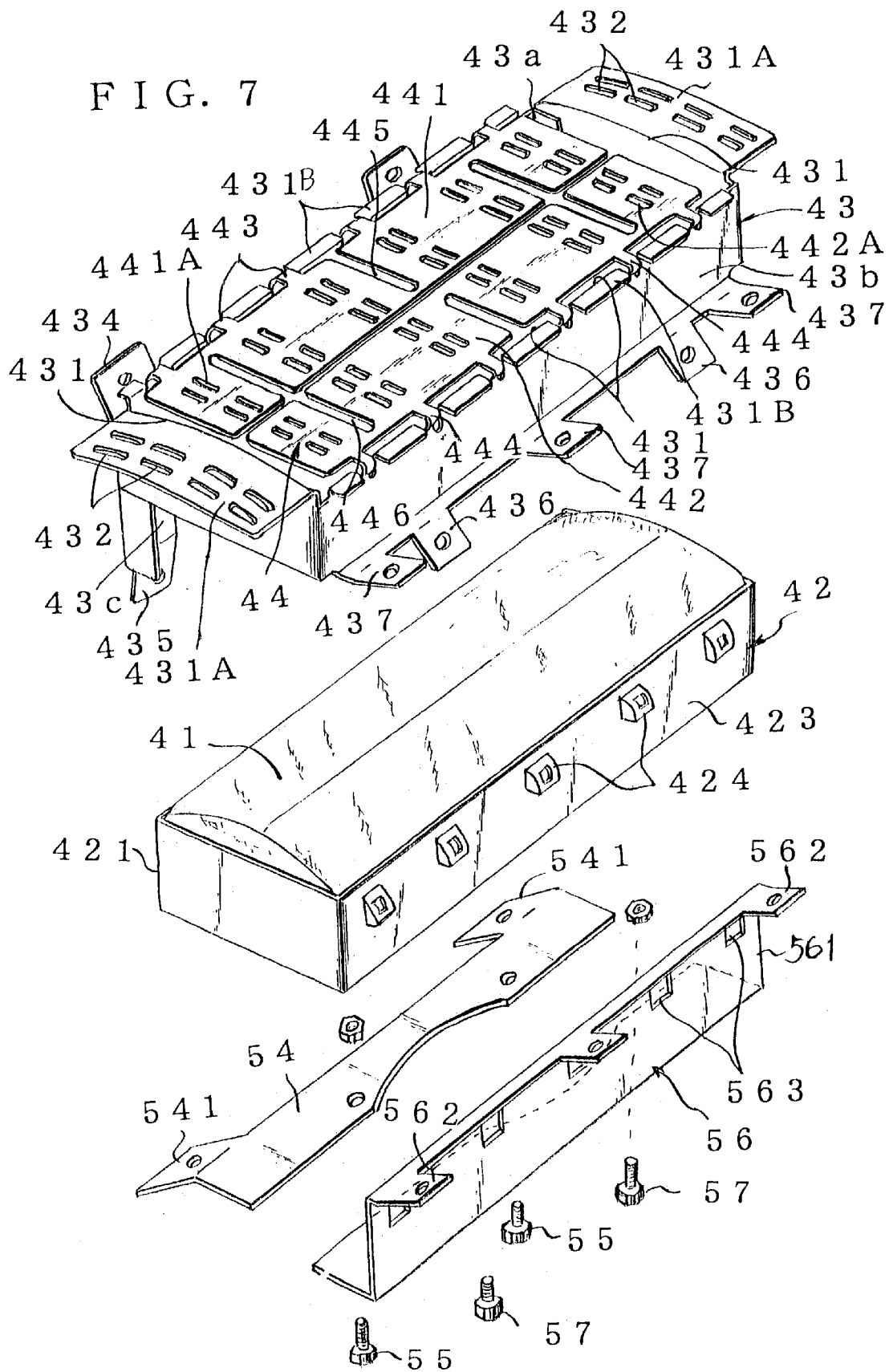
FIG. 7 is an exploded perspective view showing a frame member and a reinforcement plate member formed as a unit and airbag components in the first embodiment.

As shown in FIGS. 6 and 7, a plurality of engagement protrusions 422 are provided on a front wall 421 of the airbag case 42 for engagement with corresponding engagement holes 438, which are formed in the front wall 43c of the frame member 43 while being arranged at equal intervals in the longitudinal direction of the frame member 43. A support plate 54 extending in the longitudinal direction of the airbag case 42 is fixedly attached to a front portion of a bottom of the airbag case 42 at a plurality of positions by use of bolts 55 and nuts. A plurality of connection segments 541 are provided at the front end of the support plate 54 in a frontward projecting condition.

As shown in FIGS. 6 and 7, a plurality of engagement protrusions 424 are provided on a rear wall 423 of the airbag case 42 while being arranged at equal intervals in the longitudinal direction of the airbag case 42. A support plate 56 extending in the longitudinal direction of the airbag case 42 is disposed in close contact with the airbag case 42 at a rear portion of the bottom and at the rear wall 423. The support plate 56 is fixedly attached to the bottom of the airbag case 42 at a plurality of positions by use of bolts 57 and nuts. A plurality of connection segments 562 are provided at the upper end of a vertical wall 561 of the support plate 56 in a backward projecting condition. A plurality of engagement holes 563 are formed in the vertical wall 561 of the support plate 56, which abuts the rear wall 423 of the airbag case 42, for engagement with the corresponding engagement protrusions 424 of the airbag case 42.

When the airbag case 42 is to be engaged with the frame member 43, as shown in FIG. 6, the front engagement protrusions 422 of the airbag case 42 are engaged with the front engagement holes 438 of the frame member 43, and the rear engagement protrusions 424 of the airbag case 42 are engaged with the engagement holes 563 of the support plate 56. Subsequently, the connection segments 541 of the support plate 54 and the front connection segments 435 of the frame member 43 are connected by use of bolts 58 and nuts, and the connection segments 562 of the support plate 56 and the rear connection segments 437 of the frame member 43 are connected by use of bolts 59 and nuts. Thus, the airbag case 42 is engaged with the frame member 43.

In FIG. 6, reference numeral 60 denotes an inflater for supplying inflation gas to the airbag 41. The inflater 60 is fixedly attached to a bottom portion of the airbag case 42. Reference numeral 61 denotes a support member whose one end is fixedly attached to the bottom surface of the airbag case 42. The other end of the support member 61 is fixedly attached to a fixation member of a car body by means of, for example, a cross member 62 used to support the instrument panel core 2. In the present embodiment, the other end of the support member 61 is fixedly attached to an airbag support bracket 63, which in turn is fixedly attached to the cross member 62, by use of a bolt 64 and nut.

The connection segments 435 and 541 and the connection segments 437 and 562 used to connect the frame member 43 and the support plates 54 and 56 are slanted in order to facilitate removal of the bolts 58 and 59 and nuts used to join the connection segments, through a glove box opening formed underneath the airbag apparatus. The angle of the slant is adjusted such that tools for installing/removing the bolts 58 and 59 and nuts can be inserted along the arrows F of FIG. 6 while clearing the cross member 62 disposed within the instrument panel.

The thus-configured airbag apparatus for an automobile according to the present embodiment functions in the following manner. Upon collision of the vehicle, an impact force caused by the collision is detected by an unillustrated known sensor. An unillustrated control unit including a known CPU judges whether or not the detected impact force is equal to or higher than a predetermined value. When the control unit judges that the impact force is not lower than the predetermined value, the control unit issues a signal for causing the inflater 60 to generate a predetermined gas. The gas is fed to the airbag 41 so as to promptly inflate the airbag 41 (see FIG. 10).

When pressure generated at the initial stage of inflation of the airbag 41 is imposed on the reinforcement plates 441 and 442, the fracture-opening subsections 31 and 32 reinforced by the reinforcement plates 441 and 442 are sequentially fractured along the center fracture groove 30b and the side fracture grooves 30c. Then, the reinforcement plates 441 and 442 including the fracture-opening subsections 31 and 32 are opened outward in opposite directions while being turned inside out about the hinge portions 443 and 444 as shown in FIG. 10.

According to the present embodiment, since the right- and left-hand peripheral regions along the fracture-opening section 30 are thermally joined to the joint segments 431A of the frame member 43, the peripheral regions remain intact without following the fracture-opening motion of the fracture-opening section 30. As a result, fracture along the fracture grooves 30c is performed smoothly, thereby preventing formation of a sharp edge at, or a partly detached piece from, fracture portions of the fractured fracture-opening subsections 31 and 32 upon inflation of the airbag 41 and thus providing neat fracture surfaces.

Furthermore, since peripheral regions along the hinge grooves 30a of the fracture-opening section 30 are reinforced by the rest segments 431B bent from the edge portions 431 of the frame member 43, the instrument panel cover 3 including the fracture-opening section 30 exhibits enhanced resistance to a pressing force applied to the instrument panel cover 3 from above, thereby preventing occurrence of cracking or deformation of the instrument panel cover 3 when the airbag apparatus is unused.

According to the present embodiment, since a plurality of slits 445 and 446 are formed in the reinforcement plates 441 and 442, the slits 445 and 446 absorb a thermal expansion difference between the reinforcement plates 441 and 442 and the fracture-opening subsections 31 and 32. Thus, even when the reinforcement plates 441 and 442 and the fracture-opening subsections 31 and 32 are exposed to a high-temperature atmosphere, fracture of thermal joint protrusions 31A and 32A of resin joining them can be prevented.

According to the present embodiment, the frame member 43 and the reinforcement plate member 44 are configured as a single unit, and attachment to the inside surface of the instrument panel cover 3 is facilitated.

The airbag case 42 is separably connected to the frame member 43. Thus, when a car is to be scrapped, the airbag case 42 can be easily detached from the frame member 43, so that an inflater and other relevant components, which are categorized as industrial wastes, can be easily removed for proper disposal to thereby prevent potential environmental contamination.

Next, an airbag apparatus for an automobile according to a second embodiment of the present invention will be described with reference to FIGS. 11 and 12.

Figure 11:
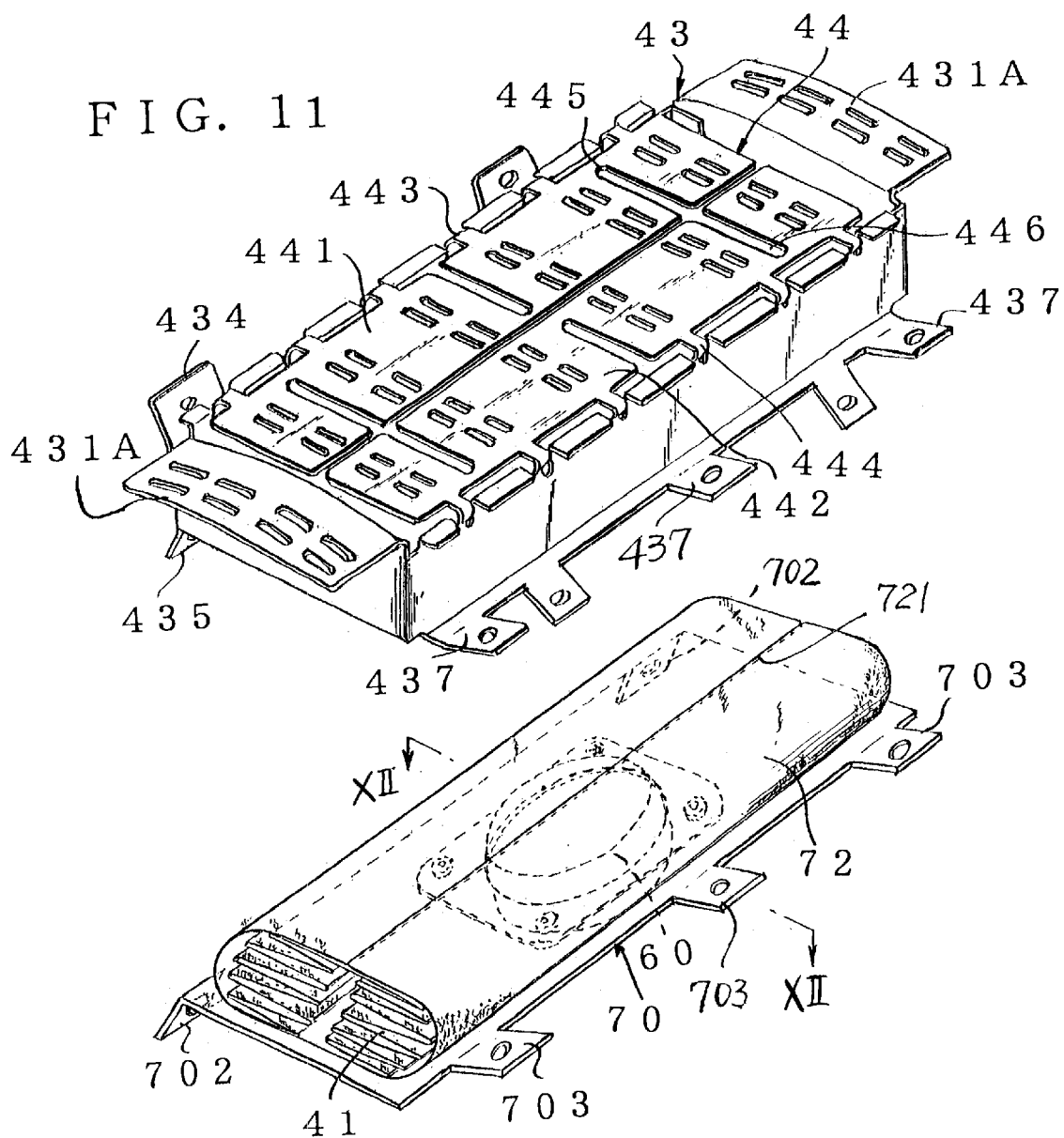
FIG. 11 is an exploded perspective view showing a frame member and an airbag support member in an airbag apparatus for an automobile according to a second embodiment of the present invention.
Figure 12:
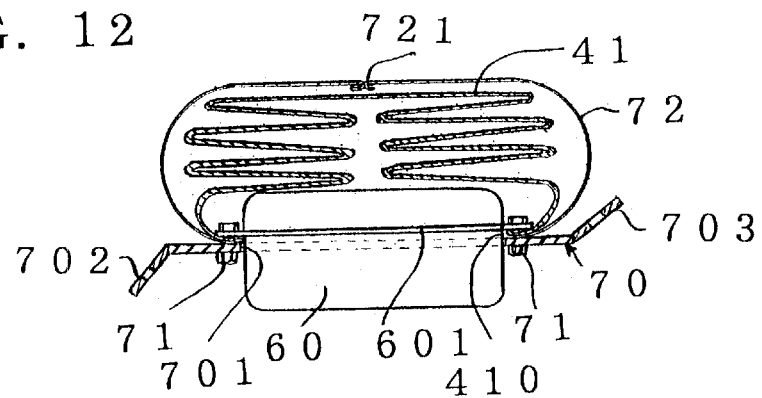
FIG. 12 is a sectional view taken along line XII—XII of FIG. 11.

FIGS. 11 and 12 show a frame member and an airbag support member in the airbag apparatus of the second embodiment.

The second embodiment shown in FIGS. 11 and 12 differs from the first embodiment shown in FIG. 6 in an airbag 41 and an airbag support member 70.

As shown in FIGS. 11 and 12, the airbag support member 70 corresponds to the airbag case 42 and the support plates 54 and 56 shown in FIG. 7 and is formed from a metallic flat plate. The flat airbag support member 70 assumes a rectangular shape for covering a bottom opening of a frame member 43 configured in a manner similar to that shown in FIG. 7. A circular opening 701 is formed at a central portion of the airbag support member 70 in order to receive an inflater 60. A pair of connection segments 702 are provided at longitudinally opposite ends of a front edge portion of the airbag support member 70 in an obliquely downwardly projecting condition. Three connection segments 703 are provided at longitudinally spaced positions along a rear edge portion of the airbag support member 70 in an obliquely upwardly projecting condition.

When the airbag support member 70 is to be fixedly attached to the frame member 43, the connection segments 702 of the airbag support member 70 are connected to corresponding front connection segments 435 of the frame member 43 by use of bolts and nuts (not shown), and the connection segments 703 of the airbag support member 70 are connected to corresponding rear connection segments 437 of the frame member 43 by use of bolts and nuts (not shown). In this manner, the airbag support member 70 and the frame member 43 are joined into a single unit.

When the inflater 60 fitted into a gas introduction opening 410 of the airbag 41 is to be fixedly attached to the opening 701 of the airbag support member 70, as shown in FIG. 12, a portion of the inflater 60 projecting outward from the airbag 41 is inserted into the opening 701 from above the upper surface of the airbag support member 70. Then, a flange portion 601 of the inflater 60 and a peripheral region around the opening 701 are joined at a plurality of positions by use of bolts 71 and nuts.

As shown in FIGS. 11 and 12, the airbag 41 is accommodated in a folded condition within the frame member 43, which is closed by the airbag support member 70, while being covered with a cloth 72. A seam 721 to be fractured upon inflation of the airbag 41 is at a portion of the cloth 72 which faces the instrument panel cover 3 (which serves as the surface panel); i.e., a reinforcement plate member 44 of the frame member 43. The cloth 72, together with the inflater 60 and the airbag 41, is fixedly attached to the airbag support member 70.

The second embodiment yields actions and effects similar to those yielded by the first embodiment shown in FIGS. 6 and 7. Additionally, the airbag support member 70 is simpler in structure than that of the first embodiment shown in FIGS. 6 and 7, thereby reducing the number of components and thus reducing cost. Furthermore, since the folded airbag 41 is covered with the cloth 72, the airbag 41 can be stably held in a folded condition.

Since the airbag support member 70 for supporting the airbag 41 and the inflater 60 is flat, even when a space within an instrument panel is narrow, the airbag 41 and the airbag support member 70 can be easily taken out from inside the instrument panel without need to remove the instrument panel and peripheral components. Specifically, after removal of the bolts and nuts used to fix the airbag support member 70 in place, the airbag 41 and the airbag support member 70 are removed while the airbag 41 is deformed and during clearing of the peripheral components.

Next, an airbag apparatus for an automobile according to a third embodiment of the present invention will be described with reference to FIG. 13.

Figure 13:
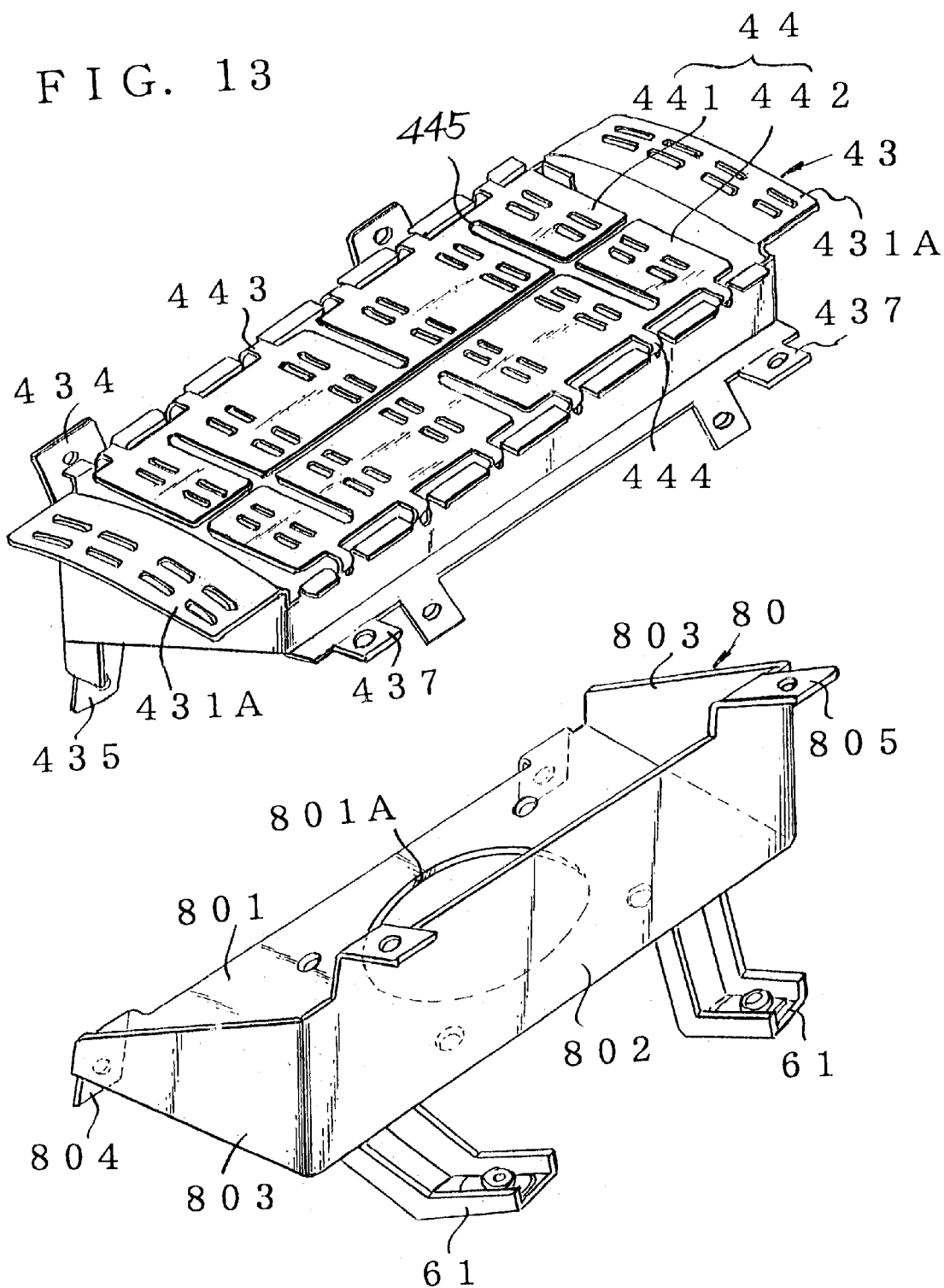
FIG. 13 is an exploded perspective view showing a frame member and an airbag support member in an airbag apparatus for an automobile according to a third embodiment of the present invention.

FIG. 13 shows a frame member and an airbag support member in the airbag apparatus of the third embodiment.

The third embodiment shown in FIG. 13 differs from the first embodiment shown in FIGS. 6 and 7 in an airbag support member 80 for supporting an airbag 41 and an inflater 60.

As shown in FIG. 13, the airbag support member 80 corresponds to the airbag case 42 and the support plates 54 and 56 shown in FIG. 7. The airbag support member 80 includes a bottom plate portion 801 assuming a rectangular shape for covering a bottom opening of a frame member 43 configured in a manner similar to that shown in FIG. 7; a rear panel portion 802 bent vertically from a lateral end of the bottom plate portion 801 and extending over the entire longitudinal length of the bottom plate portion 801; and triangular side panel portions 803 bent vertically from longitudinal opposite ends of the bottom plate portion 801 and extending over the entire lateral length of the bottom plate portion 801.

A bottom end portion of the frame member 43 is slanted downward toward the front side of the frame member 43 from the rear side so as to correspond to the shape of the airbag support member 80.

A circular opening 801A is formed at a central portion of the bottom plate portion 801 of the airbag support member 80 in order to receive an inflater 60. A pair of connection segments 804 are provided at longitudinally opposite ends of a front edge part of the bottom plate portion 801 in an obliquely downwardly projecting condition.

A pair of connection segments 805 are provided at longitudinally opposite ends of an upper edge part of the rear plate portion 802 in an obliquely upwardly projecting condition.

When the airbag support member 80 is to be fixedly attached to the frame member 43, the connection segments 804 of the airbag support member 80 are connected to corresponding front connection segments 435 of the frame member 43 by use of bolts and nuts (not shown), and the connection segments 805 of the airbag support member 80 are connected to corresponding rear connection segments 437 of the frame member 43 by use of bolts and nuts (not shown). In this manner, the airbag support member 80 and the frame member 43 are joined into a single unit.

A pair of support members 61 are provided on the lower surface of the bottom plate portion 801.

The third embodiment yields actions and effects similar to those yielded by the first embodiment shown in FIGS. 6 and 7. Additionally, the airbag support member 80 is simpler in structure than that of the first embodiment shown in FIGS. 6 and 7, thereby reducing the number of components and thus reducing cost.

Since the airbag support member 80 for supporting the airbag 41 and the inflater 60 exhibits a triangular side view, even when a space within an instrument panel is narrow, the airbag 41 and the airbag support member 80 can be easily taken out from inside the instrument panel without need to remove the instrument panel and peripheral components. Specifically, after removal of the bolts and nuts used to fix the airbag support member 80 in place, the airbag 41 and the airbag support member 80 are removed while the airbag 41 is deformed and during clearing of the peripheral components.

Next, an airbag apparatus for an automobile according to a fourth embodiment of the present invention will be described with reference to FIGS. 14 and 15.

Figure 14:
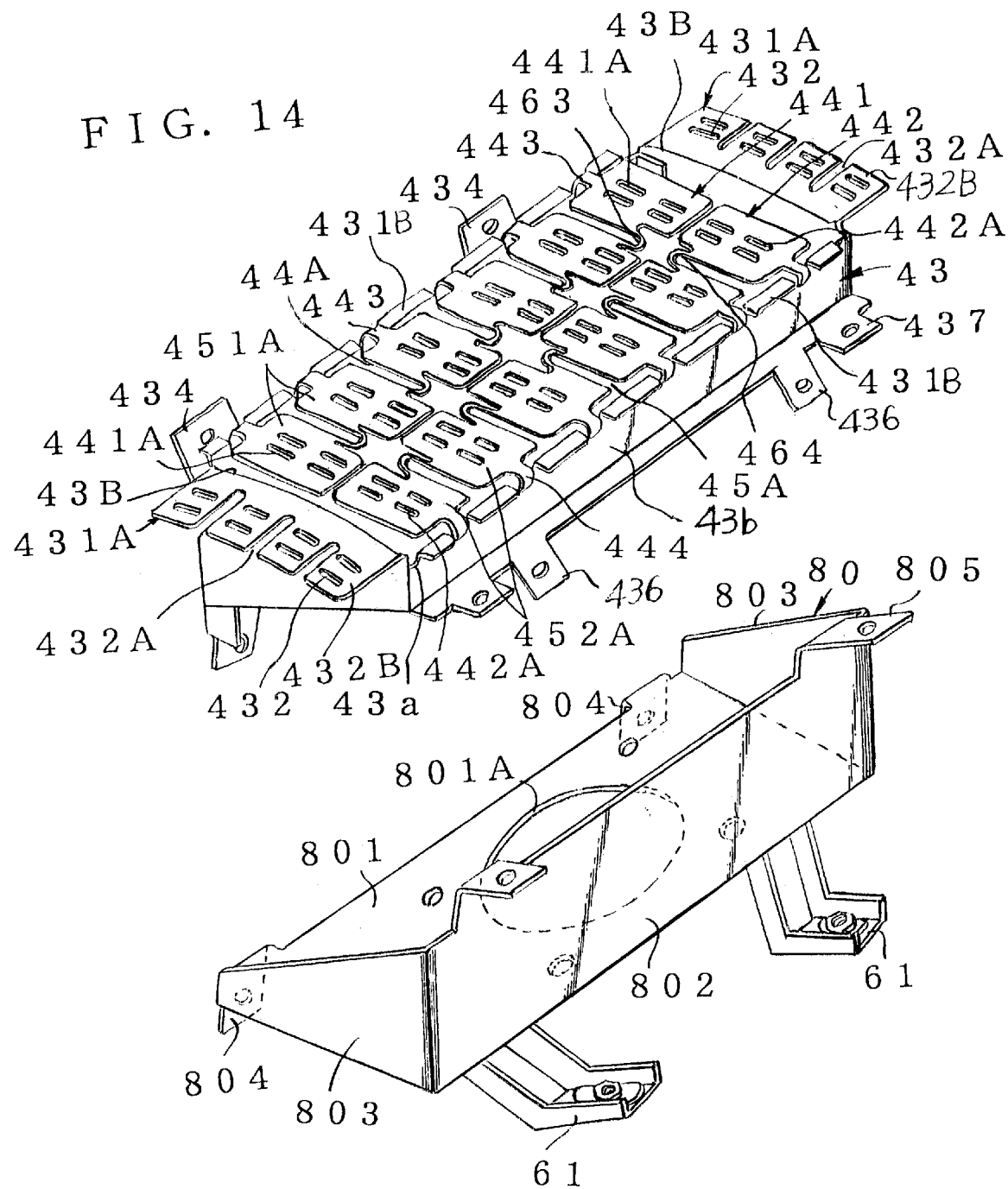
FIG. 14 is an exploded perspective view showing a frame member and an airbag support member in an airbag apparatus for an automobile according to a fourth embodiment of the present invention.
Figure 15:
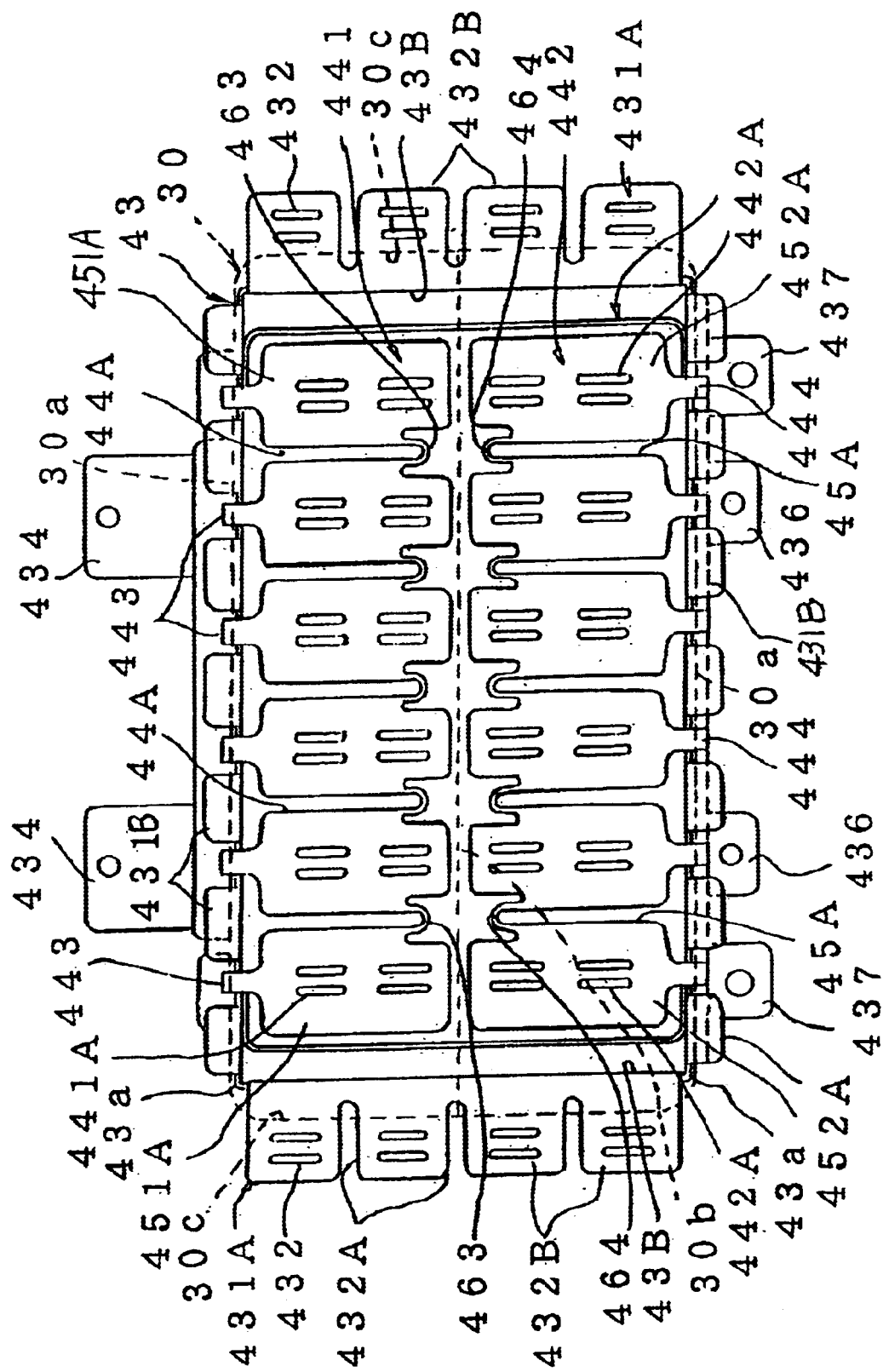
FIG. 15 is a plan view showing the frame member and a reinforcement plate member of FIG. 14.

FIGS. 14 and 15 show a frame member and an airbag support member as well as a reinforcement plate member in the airbag apparatus of the fourth embodiment.

The fourth embodiment shown in FIGS. 14 and 15 differs from the third embodiment shown in FIG. 13 in configuration of the reinforcement plate member.

Opening edge portions 43a of the frame member 43 which face front and rear hinge grooves 30a of a fracture-opening section 30 are partially bent outward substantially at right angles to thereby form rest segments 431B. The rest segments 431B are in close contact with peripheral regions along the front and rear hinge grooves 30a of the fracture-opening section 30 from inside the instrument panel cover 3 to thereby support the peripheral regions. Joint portions 431A are formed at right- and left-hand lateral edge portions 43B of the frame member 43 in such a manner as to extend outward from the edge portions 43B along the inside surface of the instrument panel cover 3.

Each of the joint portions 431A is divided into a plurality of joint segments 432B arranged in the lateral direction of the frame member 43 by slits 432A extending in the longitudinal direction of the frame member 43. A plurality of through-holes 432 are formed in the joint segments 432B and used to thermally join the joint segments 432B to the inside surface of the instrument panel cover 3.

As shown in FIG. 15, the rest segments 431B are disposed across the front and rear hinge grooves 30a, to thereby support the instrument panel cover 3 from underneath. The joint segments 432B are disposed across the fracture grooves 30c, to thereby support the instrument panel cover 3 from underneath.

The rest segments 431B and the joint segments 432B are not necessarily in close contact with the inside surface of the instrument panel cover 3 and may be disposed in the vicinity of the inside surface of the instrument panel cover 3 such that, when a force is applied to the instrument panel cover 3 from above and causes the instrument panel cover 3 to be deflected, the segments 431B and 432B support the instrument panel cover 3 from underneath against breakage of the instrument panel cover 3.

When the frame-member 43 is to be fixedly attached to the inside surface of the instrument panel cover 3, thermal joint protrusions (not shown) of resin formed integrally on the inside surface of the instrument panel cover 3 are inserted through the corresponding through-holes 432 formed in the joint segments 432B, followed by melting and crushing.

Front and rear reinforcement plates 441 and 442 are adapted to reinforce front and rear fracture-opening subsections 31 and 32 of the fracture-opening section 30. As shown in FIGS. 14 and 15, the front (rear) reinforcement plate 441 (442) is divided into a plurality of reinforcement segments 451A (452A) arranged in the longitudinal direction of the fracture-opening section 30 by slits 44A (45A). One end of each reinforcement segment 451A (452A) is connected to an opening edge portion 43a of the frame member 43 by means of a corresponding arcuately bent hinge portion 443 (444) in such a manner as to be movable for allowing inflation of the airbag 41 as shown in FIG. 10.

Every two reinforcement segments 451A (452A) which are adjacent to each other via the slit 44A (45A) are connected at their free end portions by means of an elastic segment 463 (464) which is bent in the shape of letter U on a plane including the reinforcement segments 451A (452A).

A number of through-holes 441A (442A) are formed in the reinforcement segments 451A (452A) for use in thermally joining the reinforcement segments 451A (452A) to the inside surface of the front (rear) fracture-opening subsection 31 (32). When the reinforcement segments 451A (452A) are to be fixedly attached to the inside surface of the fracture-opening subsection 31 (32), thermal joint protrusions 31A (32A) of resin formed integrally on the inside surface of the fracture-opening subsection 31 (32) are inserted through the corresponding through-holes 441A (442A) formed in the reinforcement segments 451A (452A), followed by melting and crushing.

Prior to the thermal joining work, support rods 50 and 52 provided on the inside surface of the instrument panel cover 3 and connection segments 434 and 436 provided on the side faces of the frame member 43 are connected by use of tapping screws 51 and 53 so as to tentatively fix the frame member 43 to the instrument panel cover 3, thereby positioning the frame member 43 with respect to the instrument panel cover 3 and thus improving installation workability of the frame member 43. This tentative fixation is also useful in thermally joining the joint segments 432B to the instrument panel cover 3.

The laterally extending slits 44A and 45A for dividing the reinforcement plates 441 and 442 into the reinforcement segments 451A and 452A, the hinge portions 443 and 444 for connecting the reinforcement segments 451A and 452A to the opening edge portions 43a of the frame member 43, and the elastic segments 463 (464) for connecting adjacent reinforcement segments 451A (452A) function to absorb a thermal expansion difference between the reinforcement segments 451A and 452A and the fracture-opening subsections 31 and 32 as well as a difference in expansion/shrinkage therebetween caused by application of an external force. Other configurational features are similar to those in FIG. 13 and are denoted by common reference numerals. Repeated description of such common features is omitted.

In the case of the thus-configured airbag apparatus for an automobile according to the fourth embodiment, when, upon collision of a vehicle, such as a car, pressure generated at the initial stage of inflation of the airbag 41 is imposed on the reinforcement plates 441 and 442, the fracture-opening subsections 31 and 32 reinforced by the reinforcement plates 441 and 442 are sequentially fractured along a center fracture groove 30b and side fracture grooves 30c. Then, the reinforcement plates 441 and 442 including the fracture-opening subsections 31 and 32 are opened outward in opposite directions while being turned inside out about the hinge portions 443 and 444 as shown in FIG. 10.

According to the present embodiment, since the right- and left-hand peripheral regions along the fracture-opening section 30 are thermally joined to the joint segments 432B of the frame member 43, the peripheral regions remain intact without following the fracture-opening motion of the fracture-opening section 30. As a result, fracture along the fracture grooves 30c is performed smoothly, thereby preventing formation of a sharp edge at, or a partly detached piece from, fracture portions of the fractured fracture-opening subsections 31 and 32 upon inflation of the airbag 41 and thus providing neat fracture surfaces.

Furthermore, since peripheral regions along the hinge grooves 30a of the fracture-opening section 30 are reinforced by the rest segments 431B of the frame member 43, the instrument panel cover 3 including the fracture-opening section 30 exhibits enhanced resistance to a pressing force applied to the instrument panel cover 3 from above, thereby preventing occurrence of cracking or deformation of the instrument panel cover 3 when the airbag apparatus is unused.

According to the fourth embodiment, the laterally extending slits 44A and 45A for dividing the reinforcement plates 441 and 442 into the reinforcement segments 451A and 452A, the hinge portions 443 and 444 for connecting the reinforcement segments 451A and 452A to the opening edge portions 43a of the frame member 43, and the elastic segments 463 (464) for connecting adjacent reinforcement segments 451A (452A) function to absorb a thermal expansion difference between the reinforcement segments 451A and 452A and the fracture-opening subsections 31 and 32, as well as a difference in expansion/shrinkage therebetween caused by application of an external force, thereby preventing fracture of thermal joint protrusions 31A and 32A of resin joining the reinforcement segments 451A and 452A and the fracture-opening subsections 31 and 32 which would otherwise result from the thermal expansion difference or the difference in expansion/shrinkage.

Also, the configuration allows the reinforcement segments 451A and 452A to easily follow the deformation of the fracture-opening subsections 31 and 32 upon inflation of the airbag 41, thereby preventing fracture of the thermal joint protrusions 31A and 32A of resin and enabling the fracture-opening subsections 31 and 32 to be smoothly opened.

According to the present embodiment, each of the joint portions 431A of the frame member 43 is divided into a plurality of joint segments 432B by means of slits 432A. Thus, even when an expansion/shrinkage difference between the instrument panel cover 3 and the joint portions 431A arises from temperature variations, the joint portions 431A can absorb such a difference, thereby preventing occurrence of undulation of the instrument panel cover 3 and thus maintaining the appearance of the instrument panel cover 3 intact.

Figure 16:
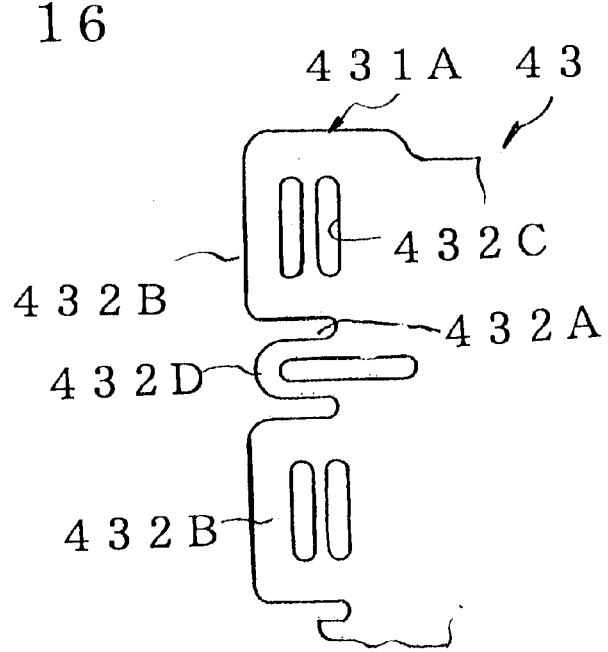
FIG. 16 is a partial plan view showing a modified joint portion of the frame member in the fourth embodiment.

FIG. 16 shows a modified joint portion of the frame member in the fourth embodiment.

According to the modified embodiment, each of the joint portions 431A is divided into a plurality of joint segments 432B arranged in the lateral direction of the frame member 43 by means of slits 432A extending in the longitudinal direction of the frame member 43; and every two joint segments 432B which are adjacent to each other via the slit 432A are connected at their free end portions by means of an elastic segment 432D which is bent in the shape of letter U on a plane including the joint segments 432B. A number of through-holes 432C are formed in the joint segments 432B for use in thermally joining the joint segments 432B to the inside surface of the instrument panel cover 3.

Through employment of the modified joint portions 431A, even when an expansion/shrinkage difference between the instrument panel cover 3 and the joint portions 431A arises from temperature variations, the joint portions 431A can absorb such a difference, thereby preventing occurrence of undulation of the instrument panel cover 3 and thus maintaining the appearance of the instrument panel cover 3 intact.

This modification is preferably applicable when the joint portions 431A have a large dimensional allowance.

Figure 17:
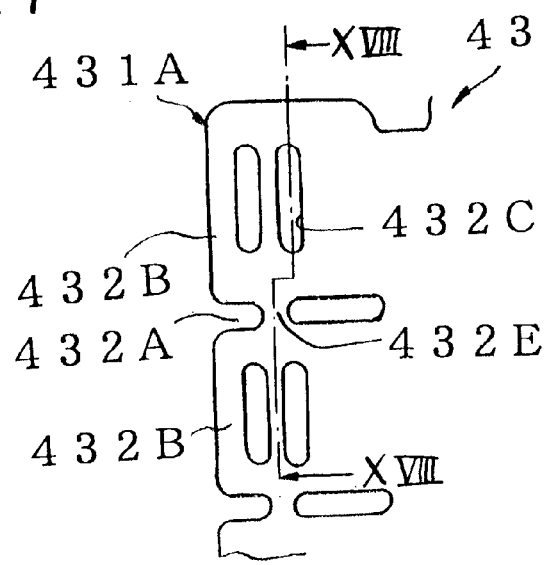
FIG. 17 is a partial plan view showing another modified joint portion of the frame member in the fourth embodiment.
Figure 18:
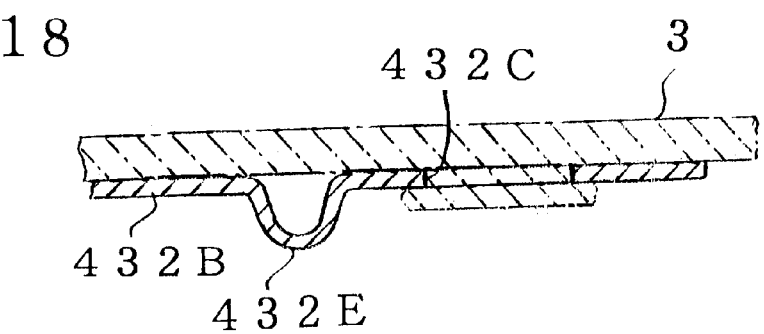
FIG. 18 is a sectional view taken along line XVIII—XVIII of FIG. 17.

FIGS. 17 and 18 show another modified joint portion of the frame member in the fourth embodiment.

According to the modified embodiment, each of the joint portions 431A is divided into a plurality of joint segments 432B arranged in the lateral direction of the frame member 43 by means of slits 432A extending in the longitudinal direction of the frame member 43; and every two joint segments 432B which are adjacent to each other via the slit 432A are connected at their intermediate portions by means of an elastic segment 432E which is bent backward in the shape of letter U. A number of through-holes 432C are formed in the joint segments 432B for use in thermally joining the joint segments 432B to the inside surface of the instrument panel cover 3.

Through employment of the modified joint portions 431A, even when an expansion/shrinkage difference between the instrument panel cover 3 and the joint portions 431A arises from temperature variations, the joint portions 431A can absorb such a difference, thereby preventing occurrence of undulation of the instrument panel cover 3 and thus maintaining the appearance of the instrument panel cover 3 intact as well as enhancing shape maintainability in the course of and after forming of the reinforcement plates 441 and 442 and the joint portions 431A including the frame member 43.

This modification is preferably applicable when the joint portions 431A do not have a large dimensional allowance.

The above embodiments are described while mentioning an instrument panel cover formed separately from an instrument panel core. However, the instrument panel cover and the instrument panel core may be formed integrally. The embodiments are described while mentioning an airbag apparatus for a front passenger seat. However, the present invention is also applicable to an airbag apparatus to be disposed at other portions of a vehicle, such as a central portion of a steering wheel, a side pillar region, a side panel region including a side door, and the interior of a seat.

No particular limitations are imposed on the shape of the elastic segments 463 and 464 of the reinforcement segments 451A and 452A and the shape of the elastic segments 432D and 432E of the joint segments 432B.

The above embodiments are described while mentioning a fracture-opening section which is split open in opposite directions. However, the present invention is not limited thereto. For example, the fracture-opening section may be split open in a single direction.

According to the above-described embodiments, the hinge grooves 30*a* and the fracture grooves 30*b* and 30*c* are formed through application of a laser beam to the inside surface of an instrument panel cover. However, the present invention is not limited thereto. The grooves may be formed through milling. When milling is to be employed, the inside surface of the instrument panel cover is grooved in such a manner as to leave a wall thickness of 0.5 mm–0.8 mm on the front surface side of the instrument panel cover. Alternatively, the grooves may be integrally formed in the course of molding of the instrument panel.

What is claimed is:

1. An airbag apparatus for an automobile for protecting a person in a vehicle from impact through inflation of an airbag upon collision of the vehicle to thereby ensure safety of the person, comprising:

an airbag support member disposed behind a surface panel provided within the vehicle and adapted to support the airbag in a folded condition, the airbag being fixedly attached to a surface of said airbag support member facing the surface panel and being inflated by means of gas from an inflater;

a fracture-opening section of the surface panel, comprising a fracture groove and a hinge groove formed on an inside surface of the surface panel facing the surface of said airbag support member having the airbag fixedly attached thereto, the fracture groove and the hinge groove determining a shape of an opening for allowing the inflating airbag to project therethrough;

a frame member located between the inside surface of the surface panel and said airbag support member and fixedly attached to the surface panel, said frame member having an edge portion at one end thereof, the edge portion being in close contact with or in the vicinity of the inside surface of the surface panel at a position corresponding to a peripheral region around said fracture-opening section, an opposite end thereof being connected to said airbag support member; and reinforcement plate members fixedly attached to an inside surface of said fracture-opening section for reinforcing said fracture-opening section and connected to said frame member, by means of hinge portions, movably from a state of closing an opening of said frame member facing the surface panel to a state of opening the opening of said frame member for allowing the inflating airbag to project therethrough, wherein said frame member has a plurality of rest segments formed at the edge portion in opposition to the inside surface of the surface panel, the segments being in close contact with or in the vicinity of the inside surface of the surface panel while being located across the fracture groove or the hinge groove of said fracture-opening section, wherein said frame member has a plurality of joint segments formed at the edge portion in opposition to the inside surface of the surface panel, the joint segments being in contact with the inside surface of the surface panel such that a plurality of thermal joint protrusions formed on the inside surface of the surface panel extend through corresponding through-holes formed in the joint segments, and the thermal joint protrusions are melted and crushed to thereby fixedly attach said frame member to a peripheral region adjacent the fracture groove of said fracture-opening section, and wherein fixation members are provided on said frame member and the surface panel for fixing them together.

2. An airbag apparatus for an automobile according to claim 1, wherein said frame member and said airbag support member are separably connected.

3. An airbag apparatus for an automobile according to claim 1, wherein said reinforcement plate members comprise at least two reinforcement plates; a plurality of through-holes are formed in the reinforcement plates; a plurality of thermal joint protrusions formed on the inside surface of said fracture-opening section extend through the corresponding through-holes; and the thermal joint protrusions are melted and crushed to thereby fixedly attach the reinforcement plates to said fracture-opening section.

4. An airbag apparatus for an automobile according to claim 3, wherein slits are formed in the reinforcement plates for absorbing a thermal expansion difference between the reinforcement plates and the surface panel.

5. An airbag apparatus for an automobile for protecting a person in a vehicle from impact through inflation of an airbag effected by means of gas from an inflater upon collision of the vehicle, comprising:

a fracture-opening section of a surface panel that faces the person in the vehicle and includes fracture grooves and hinge grooves formed on an inside surface of the surface panel, the fracture-opening section having a rectangular shape of sufficient size defined by the fracture grooves and the hinge grooves to allow the inflating airbag to project therethrough, and by the inflating airbag, the fracture-opening section being fractured in such a manner as to be split open in opposite directions with respect to a center thereof;

an airbag support member disposed inside the surface panel in opposition to said fracture-opening section and adapted to accommodate the airbag in a folded condition, one end of the airbag being fixedly attached to said airbag support member;

a frame member having a rectangular shape corresponding to said fracture-opening section, extending between the inside surface of the surface panel and said airbag support member, and supported by the surface panel, said frame member having an edge portion at one end thereof facing said fracture-opening section, the edge portion being in close contact with or in the vicinity of the inside surface of the surface panel at a peripheral region around said fracture-opening section, an opposite end thereof being connected to said airbag support member; and a plurality of reinforcement plates fixedly attached to an inside surface of said fracture-opening section and connected to the edge portion of said frame member, by means of corresponding arcuate hinge portions, movably from a state of closing an opening of said frame member facing said fracture-opening section to a state of opening the opening of said frame member for allowing the inflating airbag to project therethrough, wherein each of said reinforcement plates is divided into a plurality of reinforcement segments arranged along a longitudinal direction of said fracture-opening section; the reinforcement segments are connected to the edge portion of said frame member by means of corresponding arcuate hinge portions; and a plurality of thermal joint protrusions formed on the inside surface of said fracture-opening section extend through corresponding through-holes formed in the reinforcement segments, and the thermal joint protrusions are melted and crushed to thereby fixedly attach the reinforcement segments to said fracture-opening section.

6. An airbag apparatus for an automobile according to claim 5, wherein adjacent reinforcement segments are connected by means of elastic segments.

7. An airbag apparatus for an automobile according to claim 5, wherein said frame member comprises joint portions extending outward, along the inside surface of the surface panel, from opposite sides of the edge portion of said frame member with respect to a longitudinal direction of said fracture-opening section; and the opposite joint portions are fixedly attached to the inside surface of the surface panel.

8. An airbag apparatus for an automobile according to claim 7, wherein each of the joint portions is divided into a plurality of joint segments arranged along a lateral direction of said fracture-opening section; and a plurality of thermal joint protrusions formed on the inside surface of the surface panel extend through corresponding through-holes formed in the joint segments, and the thermal joint protrusions are melted and crushed to thereby fixedly attach the joint segments to the surface panel.

9. An airbag apparatus for an automobile according to claim 8, wherein adjacent joint segments are connected by means of an elastic segment.

10. An airbag apparatus for an automobile for protecting a person in a vehicle from impact through inflation of an airbag effected by means of gas from an inflater upon collision of the vehicle, comprising:

a fracture-opening section of a surface panel that faces the person in the vehicle and includes fracture grooves and hinge grooves formed on an inside surface of the surface panel, the fracture-opening section having a rectangular shape of sufficient size defined by the fracture grooves and the hinge grooves to allow the inflating airbag to project therethrough, and by the inflating airbag, the fracture-opening section being fractured in such a manner as to be split open in opposite directions with respect to a center thereof;

an airbag support member disposed inside the surface panel in opposition to said fracture-opening section and adapted to accommodate the airbag in a folded condition, one end of the airbag being fixedly attached to said airbag support member;

a frame member having a rectangular shape corresponding to said fracture-opening section, extending between the inside surface of the surface panel and said airbag support member, and supported by the surface panel, said frame member having an edge portion at one end thereof facing said fracture-opening section, the edge portion being in close contact with or in the vicinity of the inside surface of the surface panel at a peripheral region around said fracture-opening section, an opposite end thereof being connected to said airbag support member; and a plurality of reinforcement plates fixedly attached to an inside surface of said fracture-opening section and connected to the edge portion of said frame member, by means of corresponding arcuate hinge portions, movably from a state of closing an opening of said frame member facing said fracture-opening section to a state of opening the opening of said frame member for allowing the inflating airbag to project therethrough, wherein said frame member comprises joint portions extending outward, along the inside surface of the surface panel, from opposite sides of the edge portion of said frame member with respect to a longitudinal direction of said fracture-opening section, the opposite joint portions being fixedly attached to the inside surface of the surface panel, wherein each of the joint portions is divided into a plurality of joint segments arranged along a lateral direction of said fracture-opening section, and a plurality of thermal joint protrusions formed on the inside surface of the surface panel extend through corresponding through-holes formed in the joint segments, the thermal joint protrusions being melted and crushed to thereby fixedly attach the joint segments to the surface panel, and wherein adjacent joint segments are connected by means of an elastic segment.

11. An airbag apparatus for an automobile according to claim 10, wherein each of said reinforcement plates is divided into a plurality of reinforcement segments arranged along a longitudinal direction of said fracture-opening section; the reinforcement segments are connected to the edge portion of said frame member by means of corresponding arcuate hinge portions; and a plurality of thermal joint protrusions formed on the inside surface of said fracture-opening section extend through corresponding through-holes formed in the reinforcement segments, and the thermal joint protrusions are melted and crushed to thereby fixedly attach the reinforcement segments to said fracture-opening section.

12. An airbag apparatus for an automobile according to claim 11, wherein adjacent reinforcement segments are connected by means of elastic segments.

* * * * *